United States Patent [19]

Baker et al.

[11] Patent Number: 4,841,848
[45] Date of Patent: Jun. 27, 1989

[54] METHOD AND APPARATUS FOR RIDDLING WINE IN BOTTLES

[75] Inventors: Daniel C. Baker; Robert M. Stashak; William P. Owens, all of Santa Rosa; Gregory B. Gessner, Healdsburg, all of Calif.

[73] Assignee: F. Korbel and Bros., Guerneville, Calif.

[21] Appl. No.: 15,792

[22] Filed: Feb. 17, 1987

[51] Int. Cl.[4] .......................... C12H 1/22; B01F 11/00
[52] U.S. Cl. .................................... 99/277.2; 366/240; 366/211; 366/128
[58] Field of Search ..................... 99/277.2, 277.1, 276, 99/275; 222/161; 426/592; 209/325, 329, 330, 347; 366/108, 110, 240, 212, 111, 128

[56] References Cited

U.S. PATENT DOCUMENTS

| | | | |
|---|---|---|---|
| 892,046 | 6/1908 | Hall | 366/240 |
| 1,991,001 | 2/1935 | Reynolds | 209/347 |
| 2,056,014 | 9/1936 | Moore et al. | 259/54 |
| 3,198,502 | 8/1965 | Thompson | 366/108 |
| 3,533,602 | 10/1970 | Heck et al. | 259/54 |
| 4,235,940 | 11/1980 | Williams et al. | 426/592 |
| 4,596,469 | 1/1986 | Huntsinger et al. | 366/111 |

Primary Examiner—Robert W. Jenkins
Attorney, Agent, or Firm—Schapp and Hatch

[57] ABSTRACT

Method and apparatus for clarifying bottled wine by riddling in which the bottles of wine are positioned in generally neck-down inverted position and are subjected to abrupt limited generally vertical force capable of dislodging sediment and solids from adherence to the interior surfaces of the bottles. The apparatus accomplishes the abrupt limited generally vertical force by either lifting and dropping a platform upon which cases of bottles are positioned, or bumping the platform from below. Control means automatically cycles the jouncing action, and supplementary vibratory action, through periods of timed duration and at desired frequencies and amplitudes, the bottles being allowed to remain quiescent for desired periods of time between jouncing actions.

70 Claims, 12 Drawing Sheets

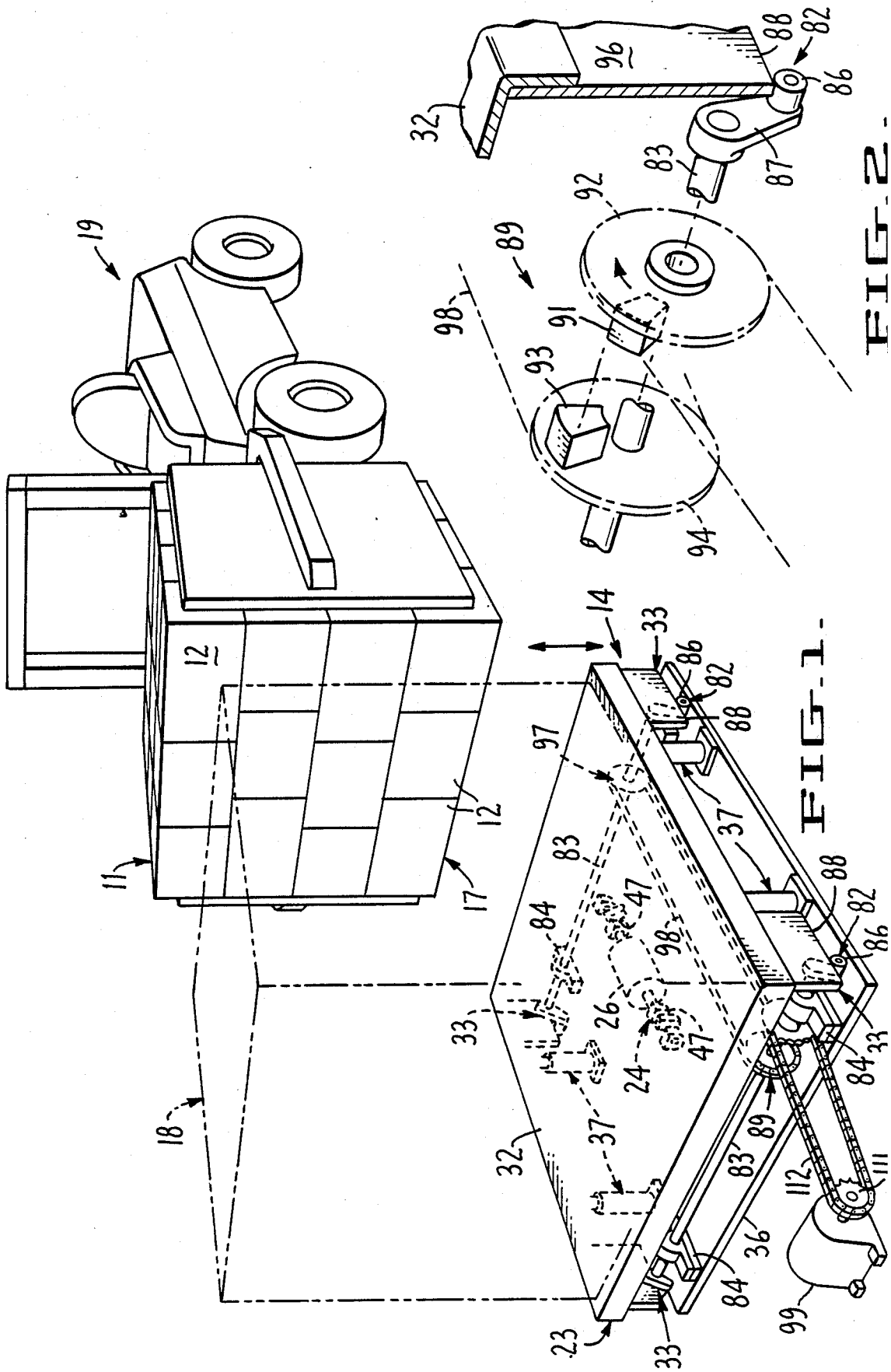

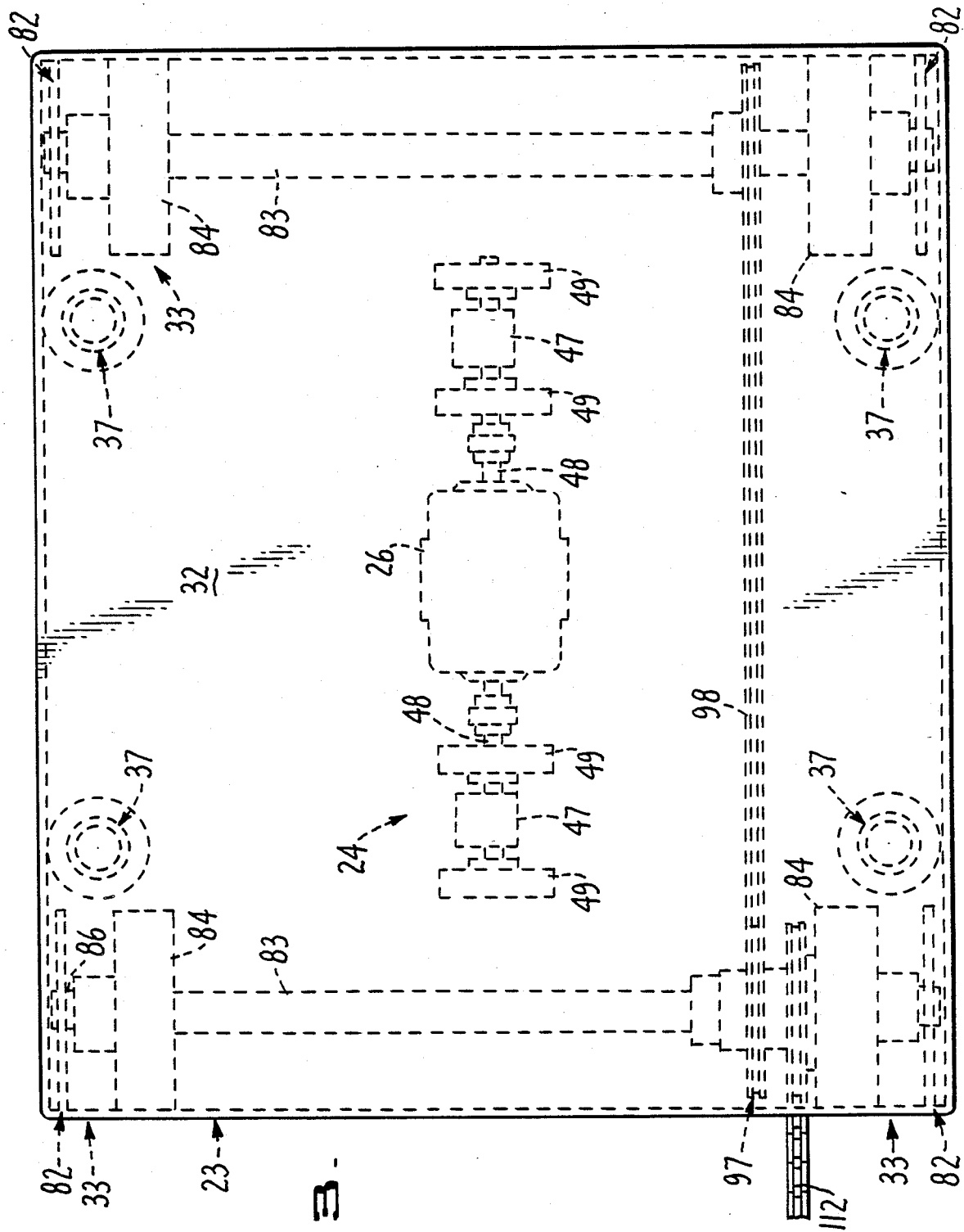

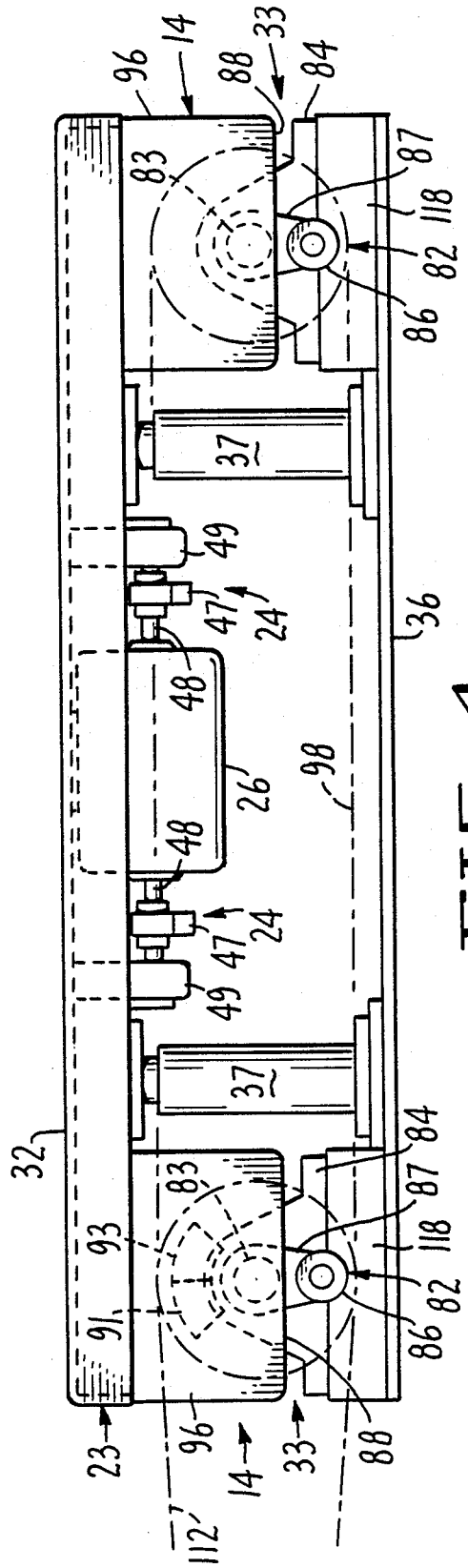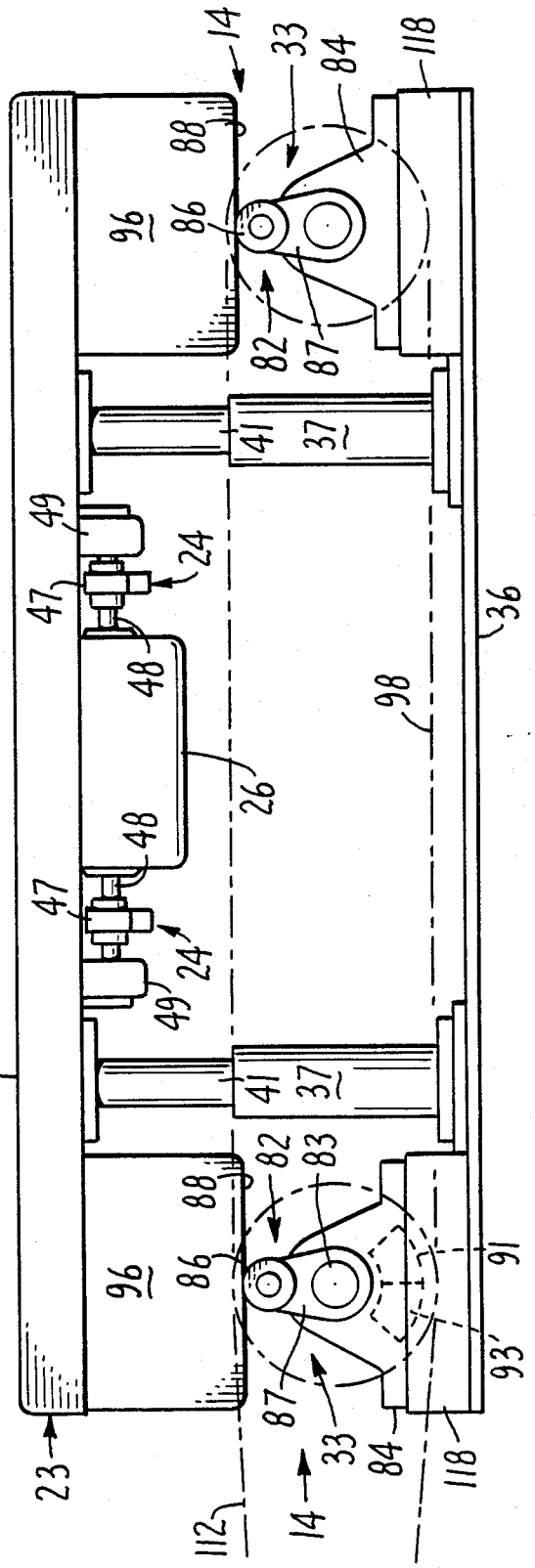

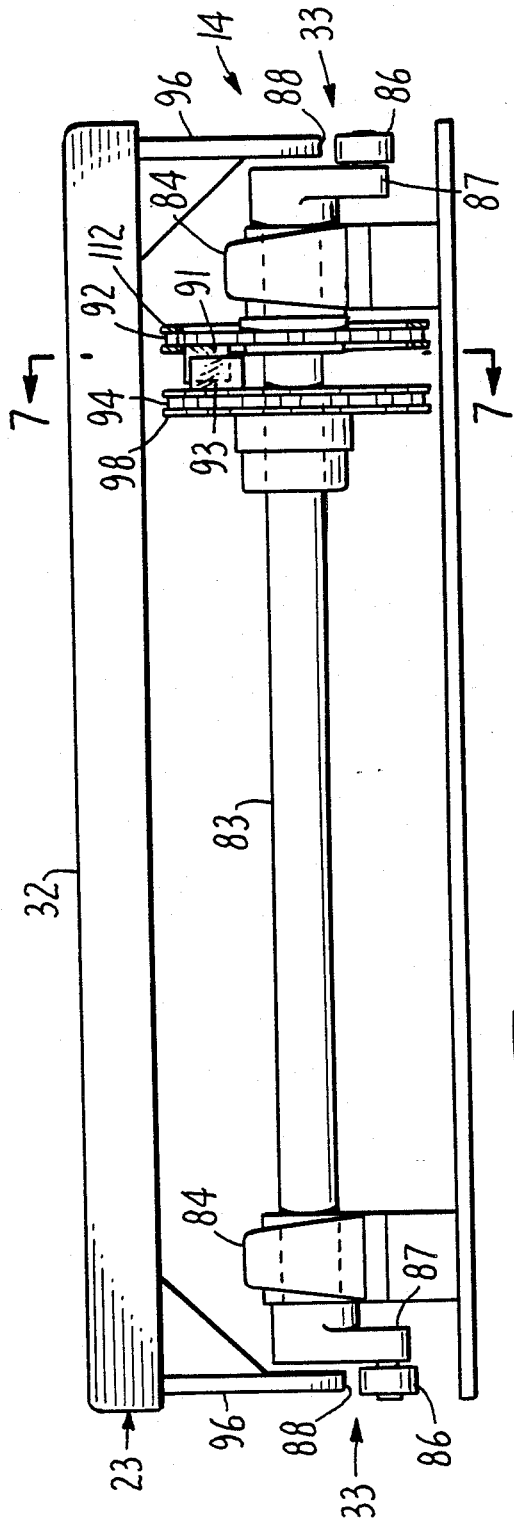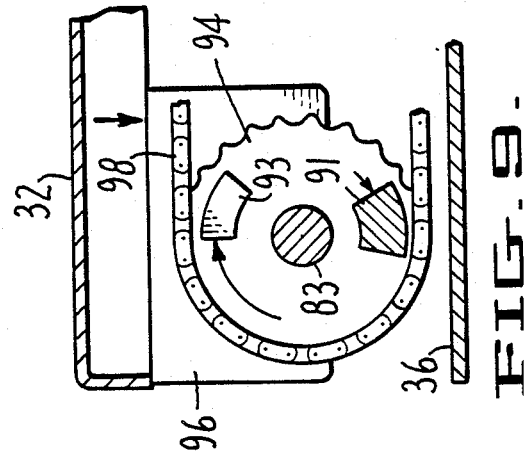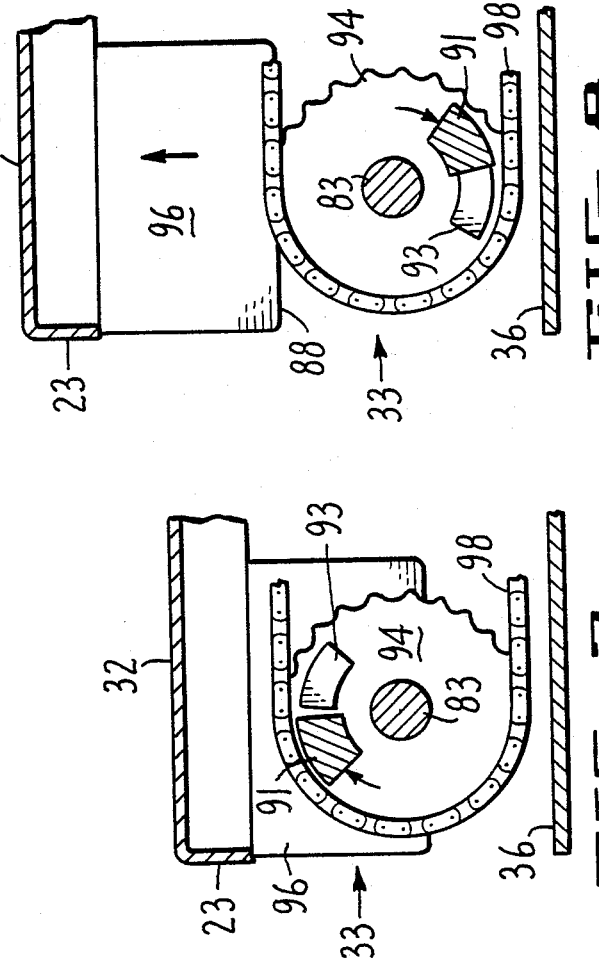

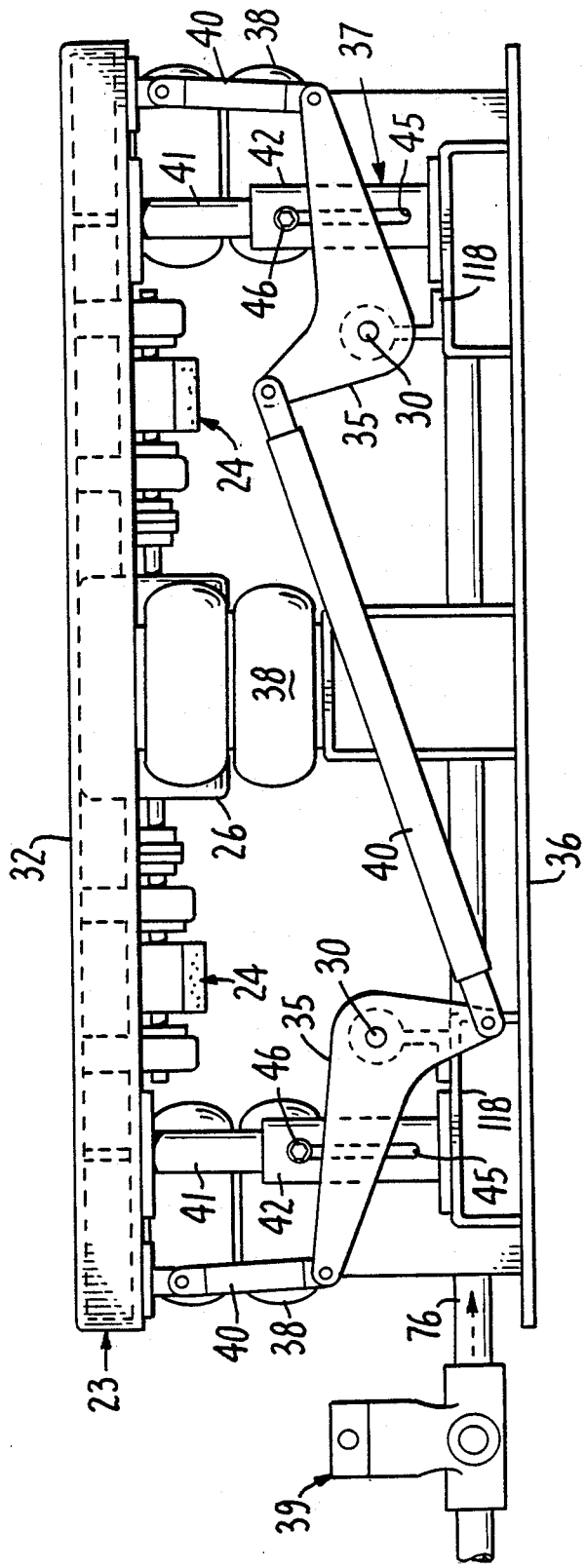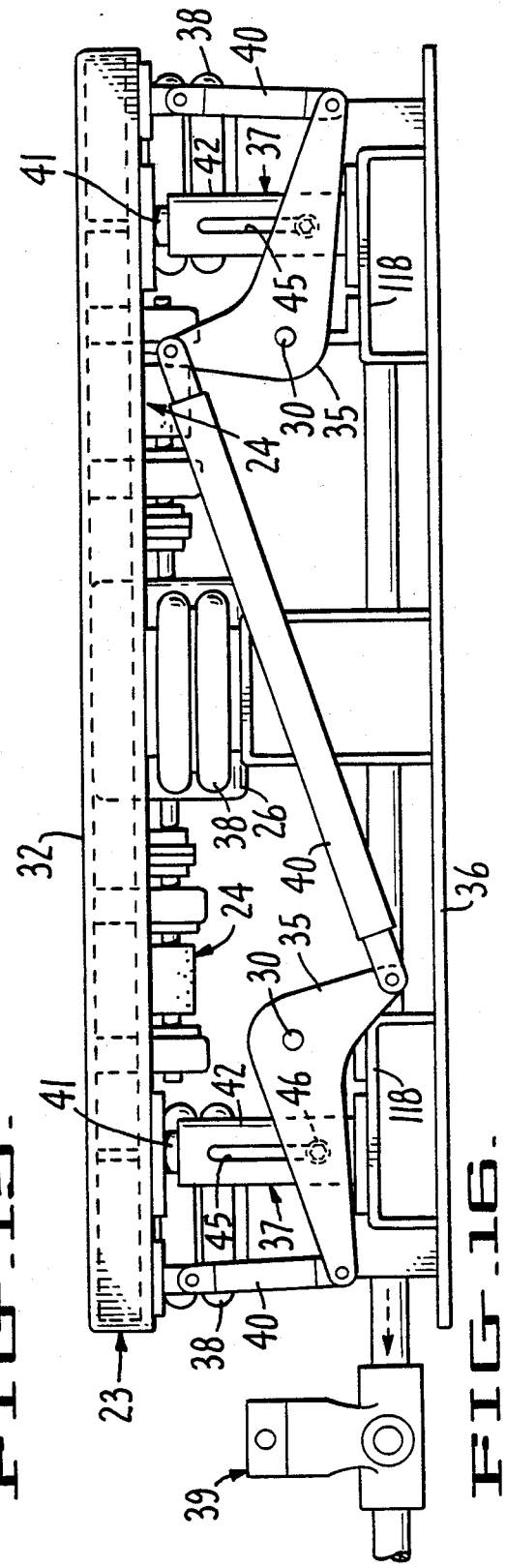

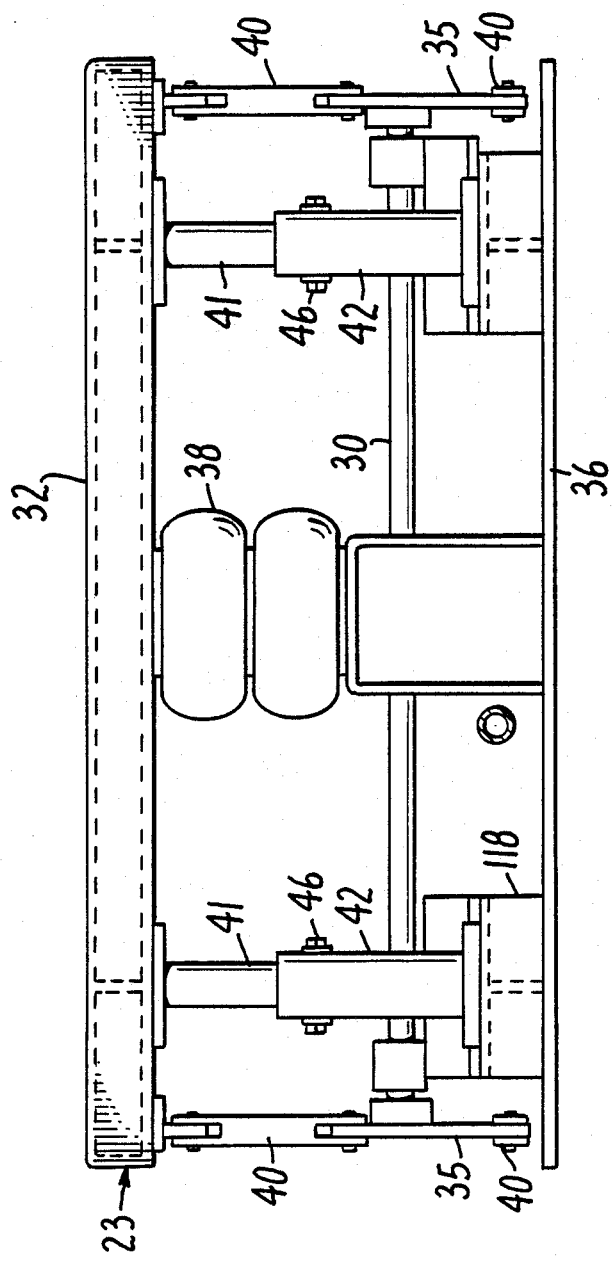
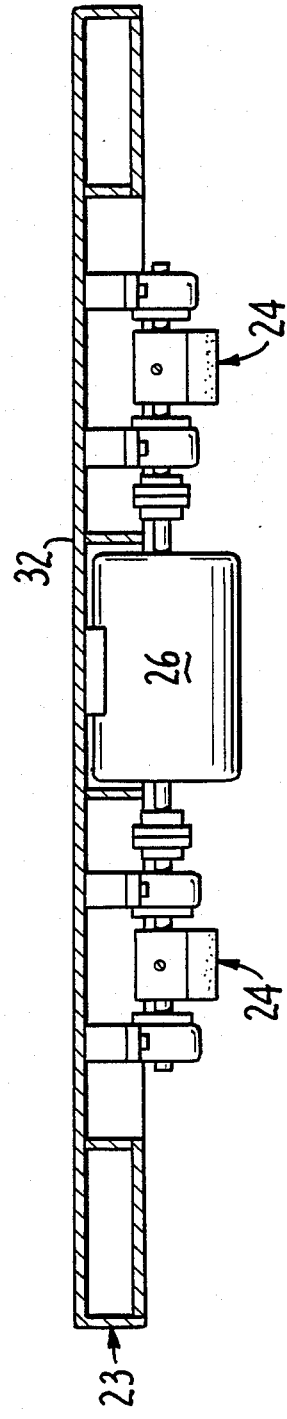
FIG. 17.
FIG. 18.

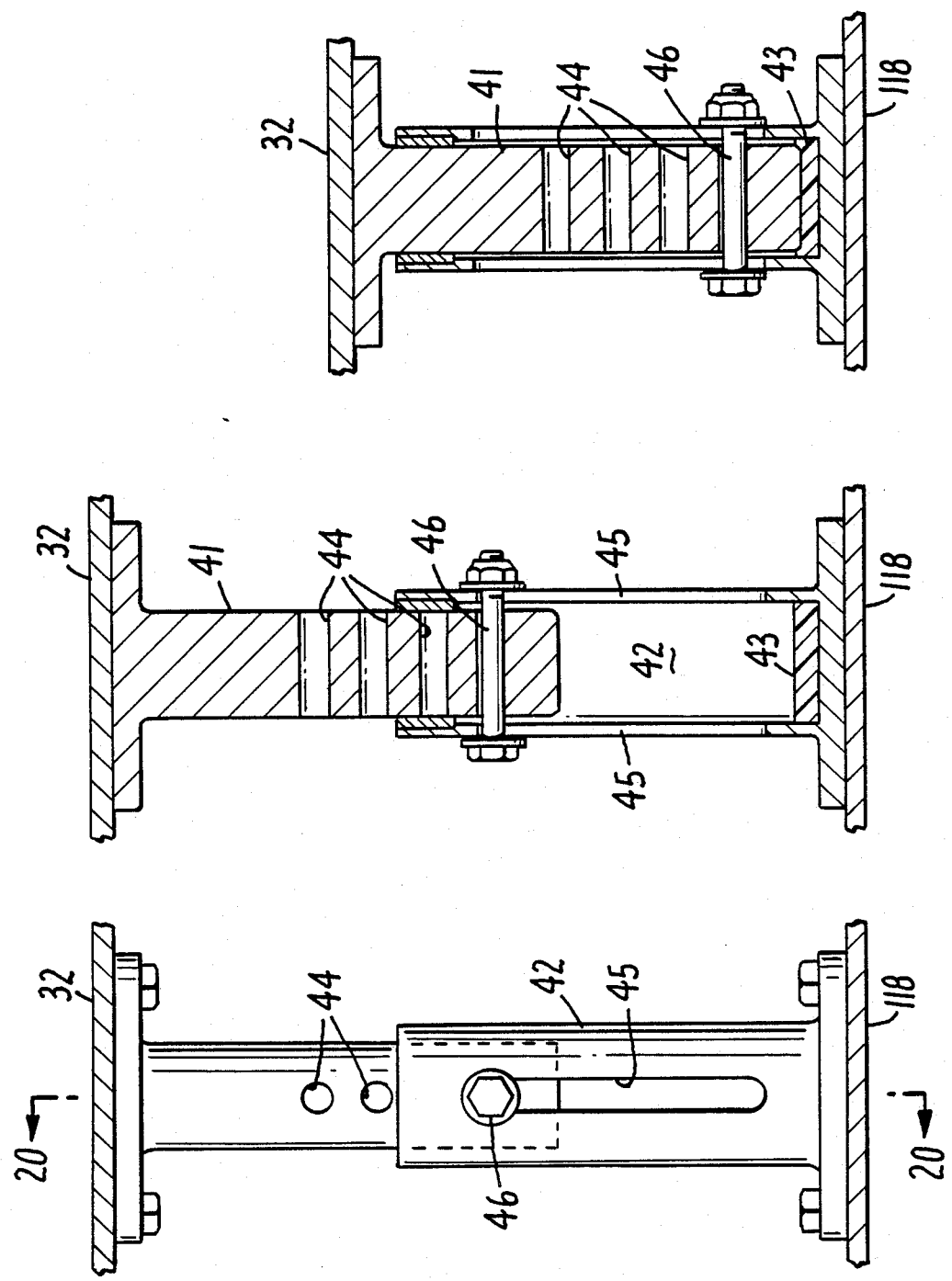

METHOD AND APPARATUS FOR RIDDLING WINE IN BOTTLES

BACKGROUND OF THE INVENTION

1. Field of the Invention.

This invention relates to improvements in the art of clarifying bottle-fermented wines, such as champagne, and more particularly relates to obtaining clarification by riddling the wine in the bottles in which it is fermented.

In the making of fine wines, and particularly in the making of bottle-fermented champagne, it is necessary to remove all suspended solids and sediment in order for the wine to have a sparkling, clear appearance. The sediment is the natural result of the fermentation process and includes yeast and other solid matter, often in the form of extremely fine particles which impart a cloudy appearance if left in the wine. The process of removing such sediment from the bottled wine has come to be known as "riddling".

The traditional method of accomplishing riddling involves placing the bottles in fixed supports having an inclined board surface through which are drilled a number of holes which receive the necks of the bottles to be riddled. Each bottle is grasped manually, pulled partway out of the supporting board, rotated approximately 90°, and then slammed back into the supporting board with sufficient force to dislodge solids from adherance to the interior of the bottle. The purpose of riddling is to deposit all of the yeast and other solids at the outlet of the bottle from whence they may be removed at a later time. Removal of the accumulated sediment from the bottle is conventionally accomplished by freezing the neck of the bottle, removing the temporary crown cap used during the fermentation process, ejecting the frozen plug of wine containing sediment and solids, and then corking the bottle.

The traditional method of riddling is very labor intensive, because the bottles of wine must be removed from the temporary cases in which fermentation takes place and placed one at a time in the holes in the inclined board rack. The bottles must be individually rotated several times a day over a period of several weeks. When the desired degree of riddling is accomplished, the bottles must then be removed from the inclined racks and placed on the neck freezing and disgorging line. Clearly, mechanizing the riddling process can result in significant savings in labor costs.

Attempts have heretofore been made to utilize mechanical apparatus for accomplishing riddling of bottled wines. For example, U.S. Pat. No. 2,056,014 discloses a rack formed for spinning rows of bottles and tilting them from one side to the other. U.S. Pat. No. 3,533,602 discloses racks which eliminate the spinning of the bottles, these racks being adapted to tilt the bottles from side to side and to vibrate the rack and bottles thereon to accomplish riddling. These mechanical rack methods of riddling are considerably less labor intensive than the original hand method. However, the bottles still must be placed in temporary cartons for fermentation, then removed from the temporary cartons one by one and placed in position on the racks, then removed one by one from the racks when the riddling function has been accomplished, and then returned to the temporary cartons for transporting to the neck freezing and disgorging apparatus.

U.S. Pat. No. 4,235,940 discloses a method and apparatus which eliminates a large part of the hand labor necessary with the mechanical riddling racks for removing the bottles from the temporary cartons and placing them in the racks, and from removing the bottles from the racks after riddling and replacing them in the temporary cartons. This elimination of hand labor is accomplished by fermenting the bottled wines in compartmented packing cases, tilting the cases from side to side to jostle the bottles, and vibrating the cases of bottles, with the jostling and vibrating serving to free the solids from adherence to the inner surfaces of the bottle as they settle to the outlet.

Different types of wine, and even different batches of the same type of wine, have different characteristics with regard to particle size, specific gravity, coherence and adherence. The vibrating action and the jostling action must be such as to dislodge the settling particles from the downwardly constricting inner surface of the neck of the bottle, in such manner that the solids will settle onto the crown cap or other member at the outlet of the bottle, for convenient disposing of the sediment as by freezing in a slug of ice. At the same time, to accomplish the riddling action in the least possible time and with the best possible results, it is necessary that neither the jostling action nor the vibrating action agitate the bottles sufficiently to stir the settled particles back into the main body of the wine. Accordingly, the number, frequency and magnitude of the jostlings and the intensity and duration of the vibrating action must be adjustable for obtaining best results with the particular wine being riddled.

U.S. Pat. No. 4,596,469 discloses a method and apparatus in which a further improved riddling action is accomplished by selectively effecting abrupt limited lateral movements of the bottled wine in a plurality of angularly related directions rather than just back and forth.

BRIEF SUMMARY OF THE INVENTION

In the method and apparatus of the present invention, it has been found that faster and better riddling can be accomplished by "jouncing" the bottles rather than by tilting them or shifting them from side to side. The term "jouncing" is here used to mean that the bottle is maintained at all times during the riddling process in inverted position, resting on the temporary crown cap and with the longitudinal axis of the bottle substantially vertically upright.

The bottle is jounced by selectively effecting abrupt limited generally vertical force on the bottle so as to accomplish riddling of the wine therein. It should be noted that the abrupt limited force is applied to the bottle in a generally vertical direction substantially parallel to the longitudinal axis of the bottle rather than by tilting the bottle or moving it abruptly to one side or the other. This vertical jouncing of the bottle is effective to dislodge sediment and solids from adherence to the inner surfaces of the bottle without stirring up or agitating the wine in a manner causing sediment or solids to be redispersed in the wine. This property materially speeds up the overall riddling process and accomplishes better riddling in a shorter time than is possible with the described prior art devices.

It has been observed that vertical jouncing of the bottle speeds up the riddling action and improves clarification. The desired jouncing action is accomplished by dropping the bottle a measured distance and abruptly halting the downward travel of the bottle, or by "bumping" the bottle from below, with sufficient force to provide the desired "jounce riddling".

It therefore is a principal object of the present invention to provide a method and apparatus for riddling wine in bottles which selectively effects an abrupt limited vertical movement of the bottle so as to create a novel dislodging action of particulate materials in the wine and facilitate their downward progress to the neck of the bottle.

Another object of the present invention is to provide a method and apparatus of the character described in which the abrupt limited vertical movement of the bottle is accomplished by lifting the bottle to a desired height and then dropping the bottle to impact on a stop member formed for abruptly halting the downward movement of the bottle.

A further object of the present invention is to provide a method and apparatus of the character described having provision for automatically providing the abrupt and limited vertical movement of the bottle at desired times.

A still further object of the present invention is to provide a method and apparatus in which the abrupt limited vertical movement of the bottle is accomplished by upward impact of a driving member against a holder for the bottle.

Yet another object of the present invention is to provide a method and apparatus of the character set forth in which a plurality of bottles of wine to be riddled are carried in individual compartments of packing cases which, in turn, are stacked to form a compact unit resting on a platform to which the desired abrupt limited vertical movement is imparted.

Another object of the present invention is the provision of a method and apparatus of the character described in which the bottles are also vibrated to assist the jouncing action caused by the abrupt limited vertical movement to accomplish clarification of the wine by riddling action.

A further object of the present invention is to provide an apparatus of the character described which is capable of automatically cycling the jouncing action and the vibrating action through active and passive periods of predetermined and adjustable duration.

Further objects and features of advantage will become apparent from the following specification and from the claims.

METHOD

The method of the present invention is directed basically to the steps of inverting a bottle of wine to be riddled to a substantially neck down position with the longitudinal axis of the bottle substantially vertical, effecting abrupt limited vertical movement of the bottle at the beginnings of periods of timed duration so as to dislodge solids and sediment in the wine from contact with the interior surfaces of the bottle, and allowing the bottle to remain quiescent for the remainders of each of such periods of timed duration after the abrupt limited substantially vertical movement takes place. The abrupt vertical movement dislodges particulate solids in the wine from adherence to the inner surface of the bottle, and the quiescent periods permit the dislodged particulate material to sink through the wine toward the extreme end of the neck of the bottle. The quiescent periods are timed for maximum efficiency with the particular wine being riddled, different varieties of wine, and different batches within a variety, often having different sink rate characteristics.

In accordance with the preferred forms of the invention the abrupt limited vertical movement of the bottle is accomplished by gently raising the bottle and then allowing it to drop downwardly. The downward drop is abruptly halted by limit stops causing shock waves to travel through the bottle and its contents.

The method of the present invention also contemplates that the jouncing, that is, the effecting of abrupt limited substantially vertical movement of the bottle, be accomplished by bumping the bottle from beneath, again sending shock waves through the bottle supporting structure.

The method of the present invention also contemplates that the bottle be vibrated during at least a portion of the active and/or quiescent periods so as to reduce re-adherence of solids in the wine to the inner surfaces of the bottle as the solids sink toward the lower extremity of the bottle neck. The bottle is vibrated for periods of predetermined and adjustable time, duration and intensity, again having regard to the riddling characteristics of the wine being treated.

The method of the present invention also contemplates confining a plurality of bottles of wine within an enclosure and imparting abrupt limited vertical movement to the enclosure so as to cause the bottles to be jounced substantially simultaneously.

The method further contemplates simultaneous riddling of a plurality of bottles of wine, with each bottle of wine being carried in one of a plurality of compartments provided by a pasteboard shipping case, with the abrupt limited vertical movement of the bottles being caused by jouncing the entire case. Carrying this concept a step further, the method of the present invention also contemplates stacking a plurality of the cases in a compact unit and placing this unit on a platform for joint movement therewith, the abrupt limited vertical movement being imparted to the platform and its entire load.

In accordance with the present invention, the bottles of wine are packed in compartmented shipping cases, where they remain during the entire fermentation, aging, settling, and riddling procedures. Clarified wine is placed in bottles, together with yeast, sugar and bentonite, the bottles being sealed with crown caps and placed in individual compartments in conventional shipping cartons and cases. The cases of bottles are then stacked in compact units with the bottles upright. The loaded cases are maintained in this position (bottles upright) at a control temperature of about 65° to 70° Fahrenheit for a period of about two to six months during which fermentation takes place. At the end of the fermentation period, the units of stacked cases are lifted and turned upside down, preferably by an inverting, embracing forklift, so that the bottles are standing on their crown caps. The inverted cases are allowed to stand from about six months to eighteen months. During this period, the wine ages and the major portion of the solids in the wine settles down into the necks of the bottles. The bentonite is a colloidal mineral clay, the particles of which when disbursed through the wine have an affinity for yeast cells and other solids. Because of higher average specific gravity, the bentonite particles and the solids adhering thereto tend to sink more rapidly through the wine into the necks of the inverted bottles than would the solids alone. In this manner, approximately ninety-five percent to ninety-eight percent of the particles and suspended solids settle out into the neck during the aging and settling period.

For final clarification by riddling the unit, consisting of the stack of cases of inverted bottles, is placed upon a platform and the described abrupt limited vertical movement (jounce) is imparted to the platform. As described in connection with the preferred forms of the invention set forth in this application, the abrupt limited vertical movement preferably is accomplished by dropping the platform from a desired height or by bumping the platform from below. However, it should be apparent that any abrupt limited vertical movement of the magnitude and character described will tend to dislodge the solids and cause them to sink toward the outlets of the inverted bottles.

In carrying out the method of the invention, it has been found that solids in some wines tend to adhere more firmly to the bottle. The method of the present invention therefore contemplates controlling the jouncing and vibrating actions in accordance with the characteristics of the particular wine being riddled. It has been found that the jouncing and vibrating actions should be intermittent, with periods of activity being separated by rest periods during which the wine is quiescent and the solids can settle further down into the necks of the bottles. The duration of the periods of activity and the rest periods is controlled in accordance with the characteristics of the solids in the particular wines being riddled.

It has also been found that optimum riddling of most champagnes by the method of the present invention can be accomplished by providing active periods of from about ten minutes to about thirty minutes separated by rest periods of about one hour to about six hours. A large number of cases of champagne have been riddled utilizing the method of the present invention in active periods of about fifteen minutes separated by inactive periods of about one hour and forty-five minutes so that the entire cycle takes place during a two hour period of time.

When the bottled wine has been sufficiently clarified by the riddling process of the present invention, the necks of the inverted bottles are refrigerated to freeze a slug of ice in the neck containing the settled solids, the crown caps are removed so that the internal pressure of the gasses in the bottles can eject the slugs of ice, and the bottles are corked. Under certain conditions, it is preferred to place a small plastic cup in the mouth of the bottle before the crown cap is applied. When the bottle is inverted, this cup opens upwardly to receive the solids. This cup or "bidule" may then be discharged with the contained solids from the bottle when the crown cap is removed.

APPARATUS

The apparatus of the present invention is designed to carry out the described method upon numbers of cases of bottles simultaneously and automatically. Preferred forms of this apparatus are illustrated in the accompanying drawings, in which:

FIG. 1 is a perspective view of an apparatus for riddling wine in bottles constructed in accordance with the present invention, with portions of the drawing being shown in dotted lines and phantom lines for clarity of illustration.

FIG. 2 is an enlarged, fragmentary perspective view of a rotary camming means constructed in accordance with the present invention, with portions of the view being broken away and shown in section and in phantom lines for clarity of illustration.

FIG. 3 is a vertical plan view on an enlarged scale of a platform forming part of the apparatus of FIG. 1, with underlying parts shown in dotted lines.

FIG. 4 is a side elevational view of the apparatus of FIG. 3, shown in lowered position.

FIG. 5 is a view similar to that of FIG. 4, but illustrating the apparatus in its raised position.

FIG. 6 is an end elevational view of the apparatus of FIG. 3.

FIG. 7 is a fragmentary sectional view taken substantially on the plane of line 7—7 of FIG. 6.

FIG. 8 is a view similar to that of FIG. 7, but illustrating the parts of the mechanism in a second position.

FIG. 9 is a view taken similarly to that of FIGS. 7 and 8, but showing the parts of the mechanism in a third position.

FIG. 12 is a perspective view of another form of the apparatus of the present invention.

FIG. 15 is a side elevational view of the apparatus of FIG. 14, with the platform being shown in elevated position.

FIG. 16 is a view similar to that of FIG. 15, but showing the platform in its lowered position.

FIG. 17 is an end elevational view of the apparatus of FIG. 15.

FIG. 18 is a cross-sectional view of a vibrating apparatus taken substantially on the plane of line 18—18 of FIG. 14.

FIG. 19 is a side elevational view on an enlarged scale of a vertical guide and stop means forming part of the apparatus of FIGS. 1 and 12.

FIG. 20 is a vertical cross-sectional view taken substantially on the plane of line 20—20 of FIG. 19 and illustating the parts in raised position.

FIG. 21 is a view similar to that of FIG. 20, but illustrating the parts in a lowered position.

Figure 10:
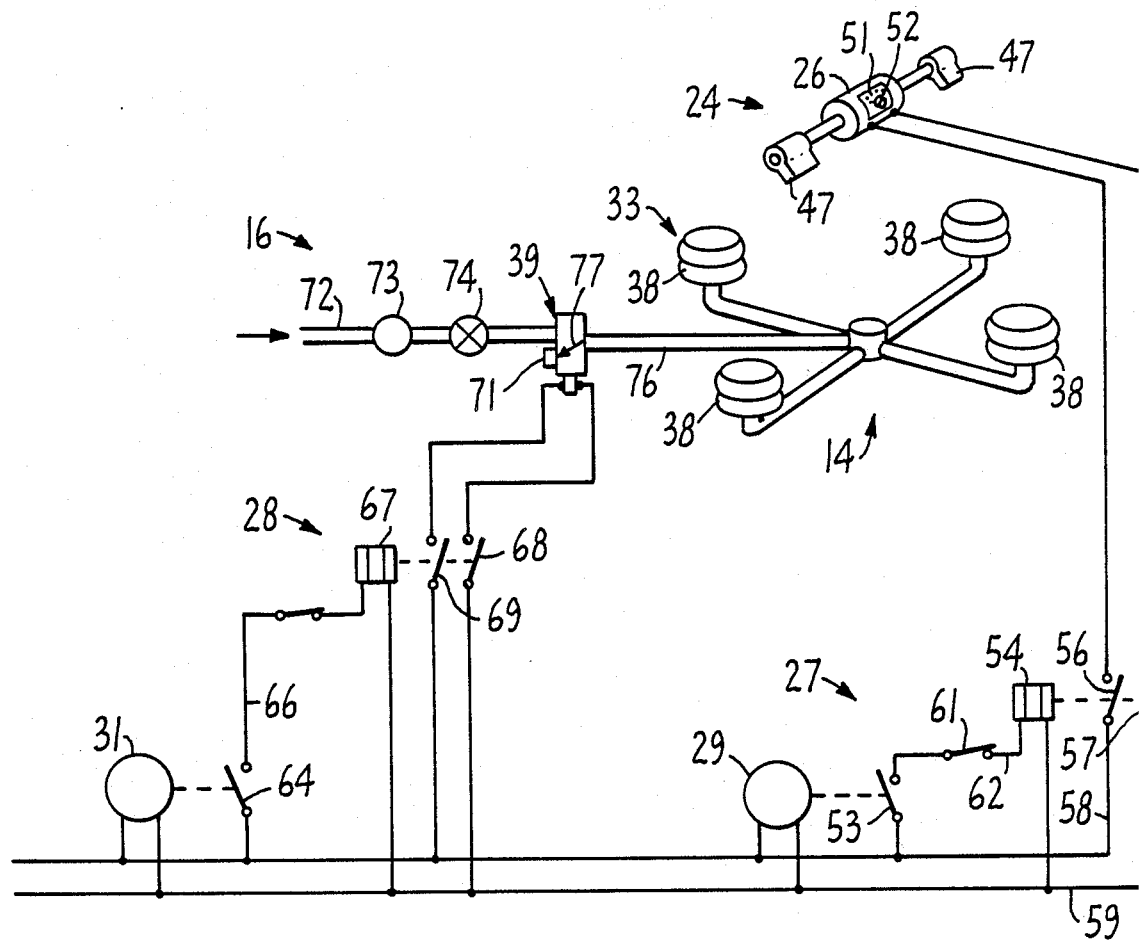
FIG. 10 is a schematic view and wiring diagram showing the control system for the apparatus.

While only the preferred forms of the invention are illustrated in the drawings, it will be apparent from the specification and claims that certain modifications may be made to the apparatus without departing from the spirit of the invention.

Referring to the drawings in detail, it will be seen that the apparatus for riddling bottled wine of the present invention includes holding means 11 formed for carrying bottled wine in cases 12 with the bottles 13 in generally neck down inverted position, jounce means 14 having an operative connection to the holding means 11 and formed for selectively effecting abrupt limited generally vertical force on the bottles 12, and control means 16 for the jounce means 14 formed for controlling the frequency and extent of the described abrupt limited vertical movement of the bottles so as to accomplish riddling of the wine therein to thereby facilitate sinking of solid particles through the wine to the discharge end of each bottle.

In accordance with the present invention, it is preferred to support a plurality of bottles of wine for effecting the aforesaid limited vertical movement ("jouncing") of the bottles substantially simultaneously in substantially the same vertical direction parallel to the longitudinal axes of the bottles. The bottles of wine are confined within an enclosure 17, and the jouncing means 14 is formed to effect the jouncing action on the enclosure 17 and the bottles 13 of wine contained therein.

The enclosure 17 may be of any suitable form capable of holding the bottles 13 in vertically inverted position during the abrupt limited vertical movement of the bottle caused by the jouncing. It has been found that the corrugated pasteboard cases used for shipping the finished wine perform admirably under the circumstances set forth permitting loading of the bottles of wine to be riddled into the shipping cases, allowing the wine to ferment in the upright bottles within the cases, inverting the shipping cases, and thereafter riddling the bottled wine while still in the cases, thus saving the large amounts of labor heretofore expended in removing bottles from the temporary aging cases, inserting them into riddling racks, removing the bottles from the racks and replacing them in the temporary cartons, etc.

In the forms of the invention illustrated in the drawings, the holding means 11 comprises one or more compartmented shipping cases 12. An enclosure of much larger capacity than an individual shipping case is here provided by stacking a plurality of shipping cases to provide a compact stack 18, in the manner best seen in FIGS. 1 and 12 of the drawings. When stacked in this configuration, the shipping cases are easily moved as a unit from one place to another, as by use of an embracing forklift 19 of the kind shown in FIGS. 1 and 12 of the drawings. The stack 18 of cases is positioned on the present apparatus during the riddling operations, as indicated by the phantom lines in FIG. 1 of the drawings.

In accordance with the present invention, and as a major feature thereof, the jouncing means 14 is formed to apply vertical force to the bottles 13 of wine in a manner capable of dislodging solids and sediment found adherent to the inner surfaces of the bottle so that the dislodged solids and sediment can drop under the force of gravity down into the neck of the bottle to rest upon the temporary crown cap 20 or a bidule carried thereon. The jouncing effect "shocks" the bottom of the neck of the inverted bottle and it is believed that this sends shock waves upwardly through the bottles' glass to accomplish the described dislodgement of the particles.

In the form of the invention illustrated in FIGS. 1 through 11 of the drawings, and in the form of the invention illustrated in FIGS. 12 through 21 of the drawings, shocking of the bottom of the neck of the inverted bottle is accomplished by lifting the bottle to a desired height, releasing the bottle to drop downwardly, and intercepting the descent of the bottles with a stop means 21 which abruptly halts the downward movement of the bottle and accomplishes the described jouncing action.

In the form of the invention illustrated in FIGS. 22 through 26 of the drawings, a hammering device 22 rises rapidly a short distance to strike the means 23 supporting the bottles. This, too, "shocks" the downward end of the inverted bottle to accomplish the described dislodgement of solids and sediment from the inner surfaces of the bottle.

It should be noted that the vertical "shocking" action acts through the glass of the bottle to accomplish dislodgement of solids and sediment without excessive stirring of the dislodged solids and sediment and dispersal of same throughout the wine. The prior art devices which spin the bottle and/or tilt the bottle from side to side inevitably cause more stirring action than does the vertical jouncing of the present invention.

As a further feature of the present invention, the present apparatus is capable of imparting vibratory motion to the bottles and the wine being riddled so as to discourage particles dislodged from the inner walls of the bottle from re-adhering to such inner walls while they are sinking through the wine. This vibratory movement is here provided by means 24. While any suitable vibrating means may be employed, it is essential that the frequency rate, amplitude, force and direction of the vibration be controllable in accordance with the properties of the wine being riddled. Preferably, the means 24 for vibrating is driven by one or more electric motors 26, and motor control means 27 is provided for controlling motor speed and starting and stopping times. Control over the frequency rate and amplitude of the vibration is accomplished, at least in part, by adjusting the speed of the motor.

Control means 28 is formed for automatically cycling the jounce means 14 through active and passive periods of predetermined and adjustable duration. Accordingly, the control means 28 includes clock means 29 formed for automatically cycling the jounce means through a plurality of cycles at predetermined times and over predetermined time intervals. Similar clock means 31 automatically cycles the vibration means 24 through active and passive periods of predetermined and adjustable duration, which are related to the active and passive periods of the jounce means 14.

In accordance with the present invention, the jounce means 14 preferably includes a support element or platform 32 formed for carrying the holding means 11 for joint movement therewith, together with drive means 33 operatively connected to the platform 32 and formed for effecting abrupt limited vertical movement of the platform and the cases of bottled wine carried thereon.

In the forms of the invention illustrated in FIGS. 1 and 12 of the drawings, the drive means 33 is a plurality of drive members 34 operatively connected to the platform 32 and adapted for engaging a fixed member, such as a frame 118, mounted on a bed plate 36 attached to the floor, the drive members 33 being mounted in laterally spaced relation to each other for lifting the platform 32 evenly so it is level at all times.

Vertical guide means 37 is operatively connected between the platform 32 and the bed plate 36 and is formed for preventing cocking of the platform 32 relative to the bed plate 34 during vertical travel of the platform. In the form of the invention illustrated in FIGS. 12 through 21 of the drawings, cocking of platform 32 also is resisted by bell cranks 35 secured to opposite ends of a rod 30 journaled on frame 118 and joined by links 40 to platform 32 in the manner best seen in FIGS. 5 and 6.

As here shown, the drive members 34 are vertically expandable lifting devices. In the form of the invention illustrated in FIGS. 12 through 21 of the drawings, the drive members 34 are provided by air bags 38 which are well known lifting devices comprising a cylindrical bellows inflatable by injection of compressed air to expand axially (vertically when the axis of the air bag is vertical). Means 39 is provided for selectively inflating and deflating the air bags 38 and includes inflation control means connected to the air bags 38 and formed for automatically supplying air under positive pressure to the air bags 38, and for venting air from the air bags 38, for selectively gently lifting and then suddenly dropping the platform 32.

In accordance with the invention, the platform and the bottles of wine thereon are abruptly halted at the bottom of their downward movement. The drive means 33 may also be characterized as lifting means, and in the forms of the invention illustrated in FIGS. 12 through 21 of the invention, the lifting means 33 is adjustable for selectively controlling the height to which the platform rises and hence the distance the bottles 13 are dropped.

As seen in FIGS. 19 through 21 of the drawings, the vertical guide means 37 provides a plurality of depending vertical rods 41 secured in laterally spaced relation to the underside of platform 32, a plurality of upwardly opening vertical tubes 42 being connected to the bed plate 36 at their lower ends and formed and positioned to slidably receive the lower ends of the rods 41. In accordance with the invention, stop members 43 are positioned in each of the tubes 42 for intercepting and abruptly halting downward movement of the lower ends of the rods 41.

Control over the shock forces generated when the bottom ends of rods 41 encounter the stop members 43 is provided by controlling the height to which the platform may be raised by the lifting means 33. As shown in FIGS. 19 through 21 of the drawings, each of the depending rods 41 is drilled to provide a plurality of vertically spaced horizontal bores 44. A removable bolt 46 is engaged through a selected one of the bores 44 and slides vertically in slots 45 formed in the wall of tube 42. Contact of the bolt 46 with the upper end of the slots 46 halts further upward movement of the platform 32 by the air bags 38. FIGS. 19 and 20 illustrate the bolt 46 being engaged through the lowermost of the bores 44 and acting to limit the rise of platform 32 to its maximum height. FIG. 21 illustrates the relative positions of these same parts when the platform 32 drops and the lower end of rod 41 strikes the stop member 43. Limiting the height to which platform 32 can rise is accomplished easily and simply by removing bolt 46 from the lowermost of the bores 44 and reengaging it through one of the bores further upon on rod 41.

The means 24 for vibrating the platform 32 and the cases 12 of bottled wine 13 resting thereon are substantially similar in the three forms of the invention illustrated. The vibrating means 24 may best be seen in FIGS. 1, 3, 4, 5, 10, 12, 14, 18, 22, and 23 of the drawings as including a pair of weights 47 eccentrically mounted on shafts 48 driven by the electric motor 26. The shafts 48 are journaled in bearings 49 secured to the underside of platform 32. The eccentric weights 47 are interchangeable with weights of greater or lesser mass, and the centers of mass of these weights are located at different distances from the shafts 48. Thus, the mass and throw of the eccentric weights may be changed to cooperate with the variable speed control of electric motor 26 accomplished by the motor control means 27, these variables making it possible to vibrate the platform 32 at the desired intensities, magnitudes and rates which are most effective for riddling the particular wine contained in the bottles 13.

Preferably, the electric motor 26 is of the well known type having a built-in variable speed control 51 built into the motor housing and operated by knob 52.

The starting and stopping times of the vibrating means 24 are controlled by the motor control means 27. As shown in FIG. 10 of the drawings, a timer clock 29 opens and closes switch 53 at desired times to operate relay 54 to open or close ganged switches 56 and 57 interposed in the electrical supply lines 58 and 59 for the electric motor 26. A disconnect switch 61 is interposed in the lead 62 from switch 53 to relay 54.

Also illustrated in FIG. 10 of the drawings is the control means 28 for activating the lifting means 33 which affords the jouncing action. The control means 28 automatically cycles the jounce means 14 through active and passive periods of predetermined and adjustable duration. Control means 28 therefore includes clock means in the form of a timer 31 formed for automatically cycling the jounce means 14 through a plurality of cycles at predetermined times and over predetermined time intervals.

The timer 31 operates switch 64 connected through lead 66 to a relay 67 which, in turn, moves electrical supply switches 68 and 69 to open and closed positions. When switches 68 and 69 are closed, they activate a solenoid valve 71 to connect the lifting means 33 to a source of air under pressure (not shown) which enters valve 71 through a conduit 72 having a pressure regulator 73 and a manual shutoff valve 74 positioned therein. When the solenoid valve is open, air under pressure passes from the solenoid valve to the lifting means 33 through a conduit 76. When the solenoid valve is deactivated, as indicated by arrow 77 in FIG. 10 of the drawings, it vents the air from conduit 76 and lifting means 33. In the apparatus illustrated in FIG. 12 of the drawings, the compressed air is fed to the air bags 38 relatively slowly to lift the platform gently so as not to cause excessive stirring up of the wine in the bottles 13. The air is vented from the air bags 38 as rapidly as possible so the platform and its cargo can drop unrestrainedly until the rods 41 strike the stop members 43.

Figure 22:
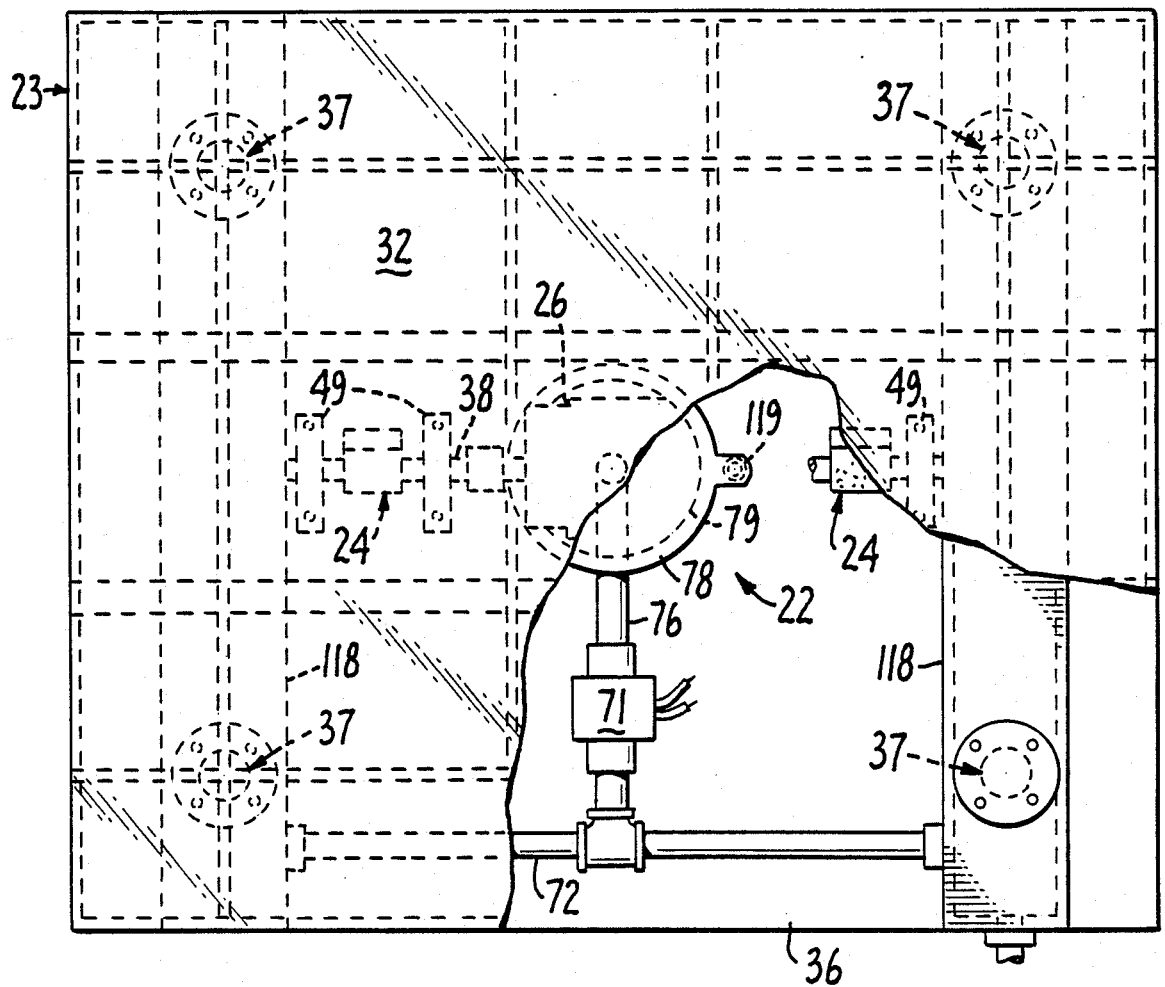
FIG. 22 is a plan view of a platform and associated structures illustrating a third form of the invention, with portions of the view being broken away and shown in dotted lines for clarity.
Figure 23:
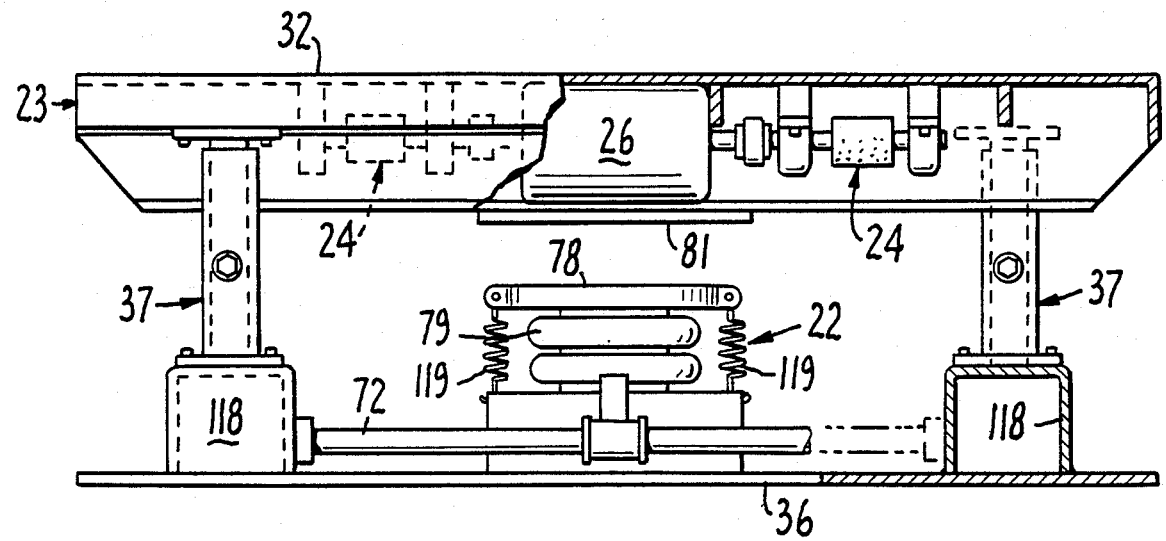
FIG. 23 is an end elevational view of the platform and associated structure of FIG. 22.
Figure 24:
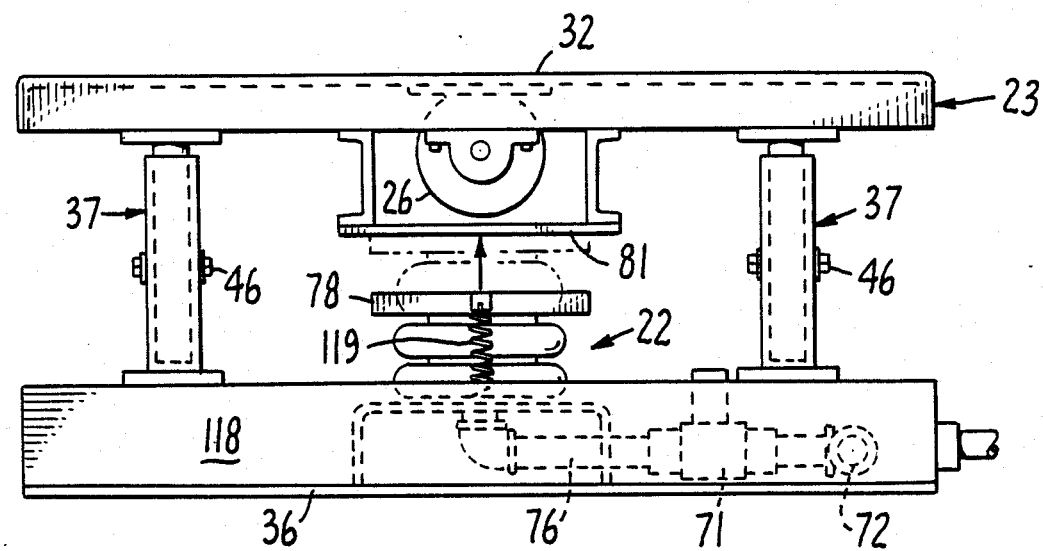
FIG. 24 is a view taken similarly to that of FIG. 23, but illustrating the "bump" effect of the device.
Figures 25, 26:
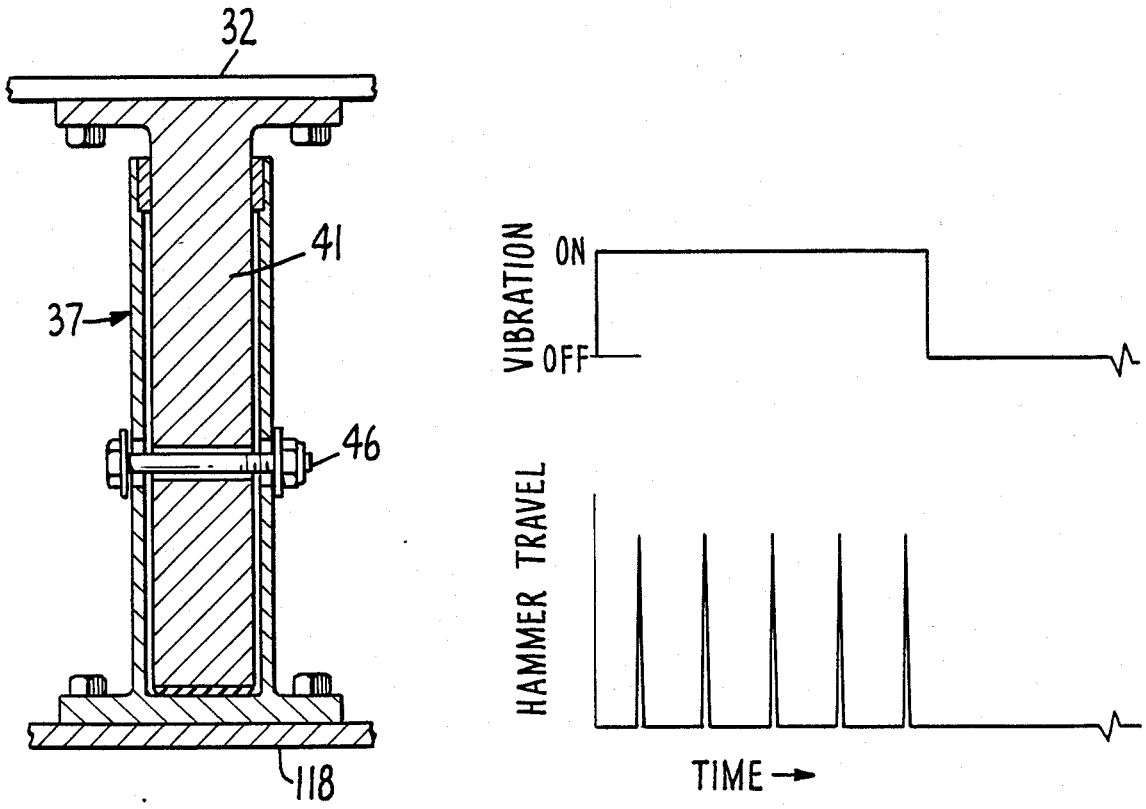
FIG. 25 is a vertical cross-sectional view of a vertical guide means forming part of the apparatus of FIG. 24.
FIG. 26 is a time chart showing the relationship between hammer travel and vibration.

In the form of the invention illustrated in FIG. 22 of the drawings, the solenoid valve 71 feeds the compressed air to the means 33 as rapidly as possible so that a hammer member 78 on the upper end of the special air bag 79 is driven forcibly upward (by a relatively short distance of a fraction of an inch) to strike against the underside of an anvil member 81 which is mounted on the underside of the platform 32. In this form of the invention, solenoid valve 71 vents the air from conduit 72 and special air bag 79 somewhat more slowly so that the return downward movement of the platform 32 does not tend to stir up the wine in the bottles 13. Control over the force of the impact of hammer member 78 against anvil member 81 is accomplished by operating valve 74 and/or pressure regulator 73 to increase or reduce the air pressure in the system, and such force is also controlled by replacing the hammer member 78 with a similar member of different mass.

Figure 11:
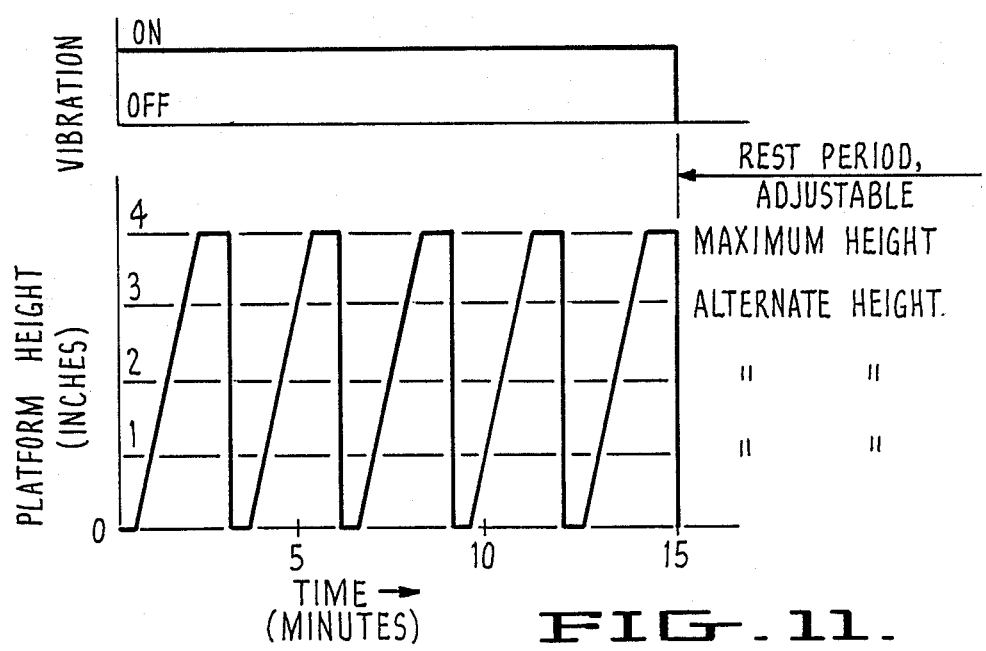
FIG. 11 is a time chart showing duration of cycles.
Figure 13:
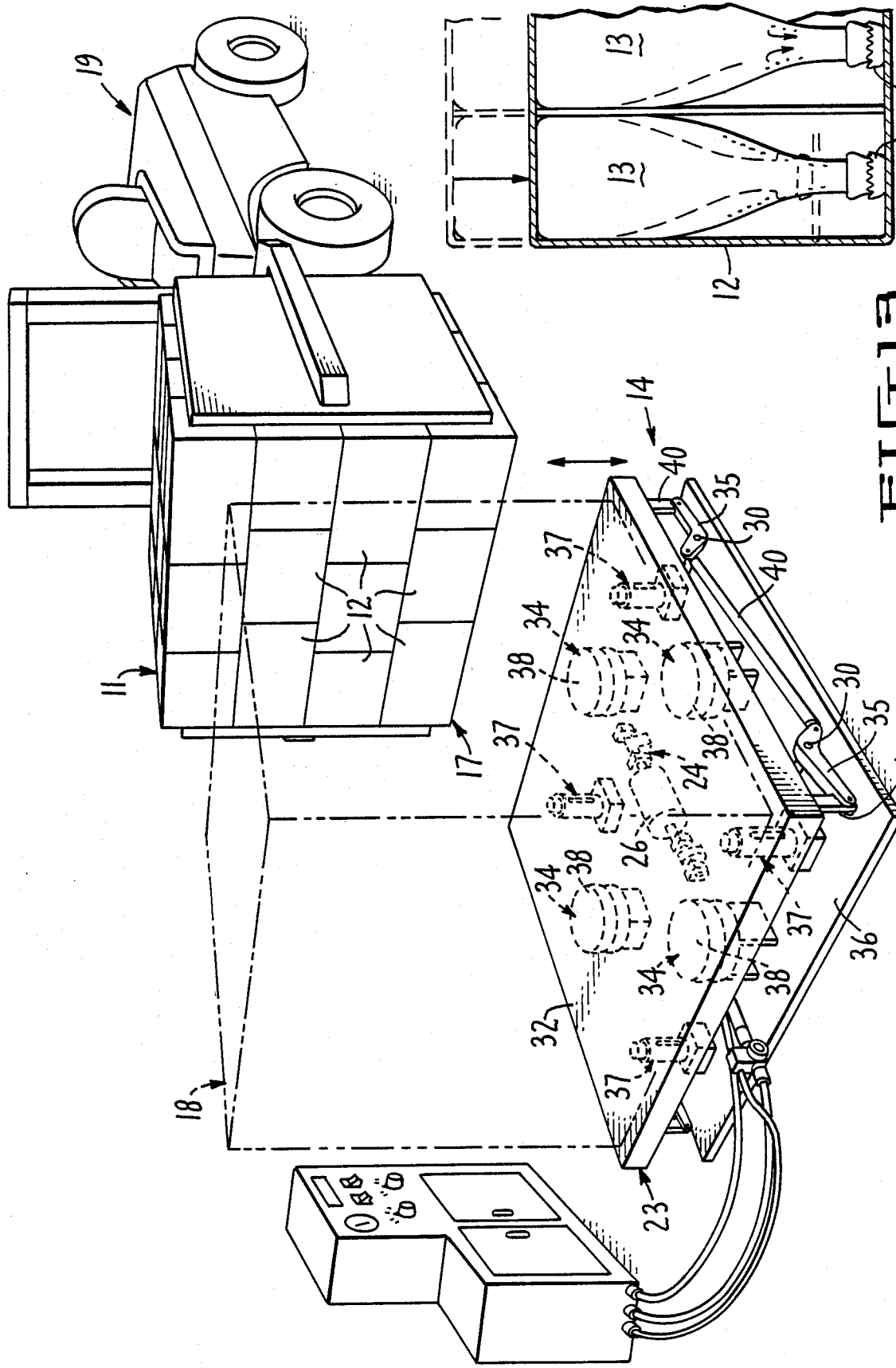
FIG. 13 is a fragmentary vertical sectional view through one end of a compartmented packing case showing the positioning of bottles of wine therein.
Figure 14:
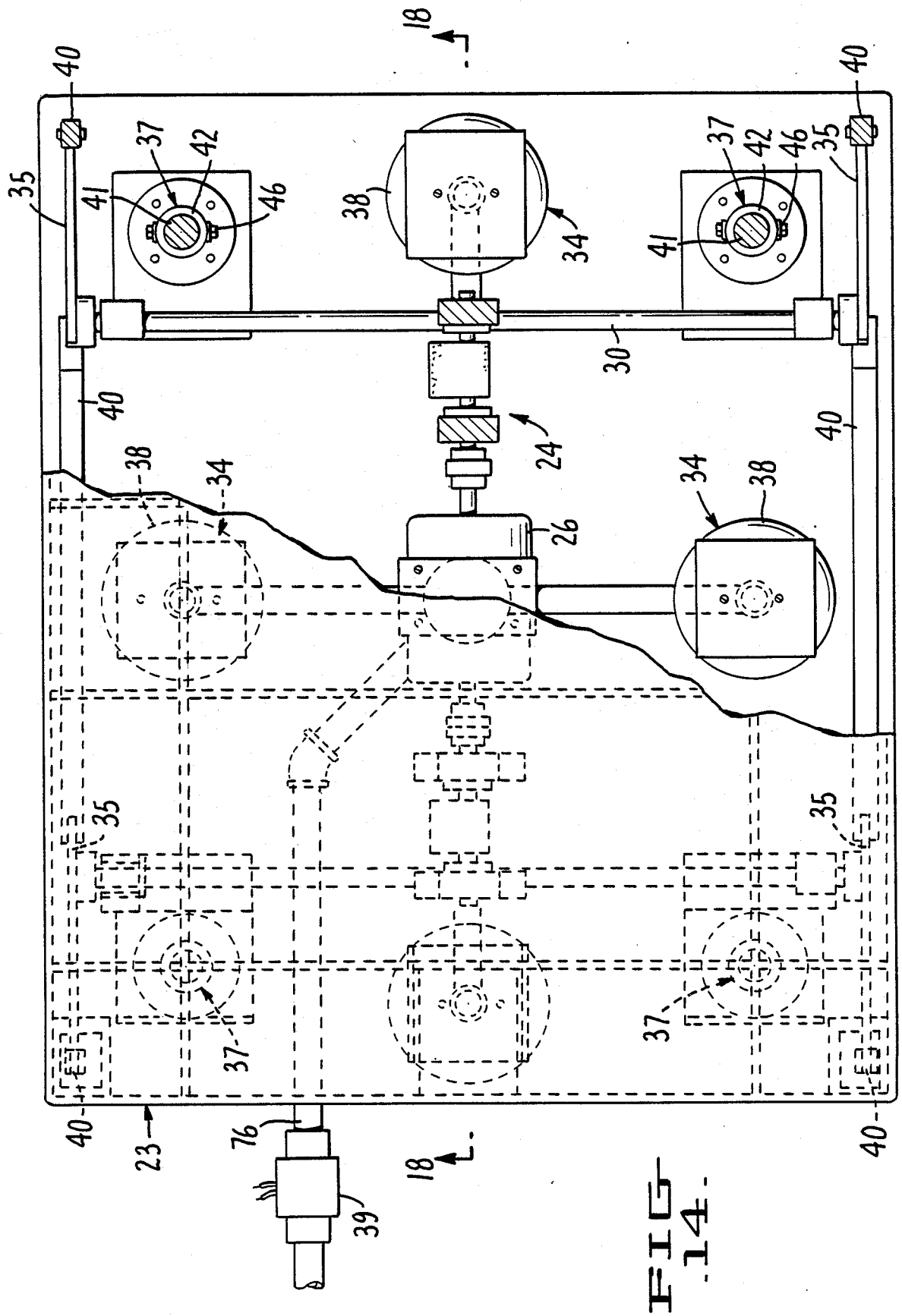
FIG. 14 is a plan view of a platform forming part of the apparatus of FIG. 12, with portions of the platform being broken away, and with underlying structure being shown in dotted lines, for clarity of illustration.

FIG. 11 illustrates a chart showing a typical relationship between platform drop, vibration and rest periods providing one cycle of the apparatus illustrated in FIG. 12 of the drawings. The inclined lines illustrate the rise of the platform 23, while the nearly vertical lines represent the abrupt drop of the platform from whichever height is selected. As shown in this chart, the vibration occurs during the same time period (15 minutes) in which the jouncing action takes place five times. Under certain circumstances, it may be desirable to have the vibration occur for a time after the last drop of the platform in the cycle or even entirely during the passive period, and under certain circumstances it may be desirable to initiate the vibration sometime during the jounce cycling rather than at the beginning. Therefore, separate timers 29 and 31 are provided for the vibration means 24 and the jounce control means 28, respectively.

In the preferred form of the invention illustrated in FIGS. 1 through 9 of the drawings, the jouncing action is accomplished by dropping the platform 32 from a desired height to afford abrupt downward movement, and rotary camming means 82 is provided for selectively lifting the platform 32 to the desired height and then abruptly dropping the platform upon further rotation of the camming means 82.

As here shown, the rotary camming means 82 includes one or more horizontal shafts 83 journaled for rotation about their own longitudinal axes in bearings 84. A roller 86 is mounted by means of an arm 87 eccentrically of each of the shafts 83 for joint rotational movement with such shaft, and the roller 86 is rotatable on arm 87 about its own horizontal axis parallel to the axis of the shaft 83 upon which it is carried. As the roller follows a circular path by reason of rotation of the shaft 83, it encounters and engages a cam surface 88 to accomplish the lifting action.

As may best be seen in FIGS. 4 and 5 of the drawings, the arm 87 normally hangs down so that the roller 86 is at the lowermost position of its circular path and the cam surface 88 is spaced somewhat thereabove. As the shaft 83 rotates, the roller moves upwardly along its circular path to the uppermost position illustrated in FIG. 5 of the drawings.

The movement of platform 33 upwardly under the influence of roller 86 acting against cam surface 88 is comparatively gentle and does not unduly agitate the wine in the bottles 13. However, if the platform were to move downwardly at the same rate of speed, it would not generate the desired jouncing action. A more efficient action results when the platform is dropped abruptly to be halted abruptly by the stop members 43.

In order to permit the relatively gentle rise of the platform followed by an abrupt dropping, a lost motion connection 89 is interposed between the shaft 83 and the roller 86. Rotation of the shaft 83 causes the roller 86 to lift the cam surface 88 to the desired height at the uppermost position of the roller, and further rotation of the shaft 83 releases the roller 86 from joint rotation with the shaft 83 permitting the roller 86, cam surface 88 and platform 32 to fall rapidly.

As may best be seen in FIGS. 2 and 7 through 9 of the drawings, the lost motion connection is provided by a first sprag member 91 secured to and projecting laterally from a sprocket 92 journaled on shaft 83. A second sprag member 93 is secured to and projects laterally from a second sprocket 94 which is mounted in parallel spaced relation to sprocket 92 and which is secured to shaft 83 for joint rotation therewith. The sprag members 91 and 93 confront each other and overlap so that as sprag 91 rotates around shaft 83 it contacts sprag member 93 causing the latter to rotate shaft 83.

When the sprag members 91 and 93 reach the position illustrated in FIG. 7 of the drawings, the roller 86 is in its uppermost position. At this point, sprag member 93 swings rapidly through a half circle down to the position illustrated in FIG. 8 of the drawings, under the influence of the weight of platform 32 and the cases 12 of bottles 13 thereon rotating shaft 83 through a half circle, and roller 86 rotates through a corresponding half circle by reason of its attachment through arm 87 to shaft 83. This rapid movement of the roller 86 through a half circle back to its lowermost position allows the cam surface 88 and attached platform 32 to drop rapidly.

Vertical guide means 37, as shown in FIGS. 19 through 21 of the drawings abruptly halt the downward movement of the platform 32 as the lower ends of the rods 41 encounter the stop members 43. The height to which platform 32 is lifted by roller 86 is controlled by increasing or decreasing the vertical height of a cam plate 96 attached to platform 32 and providing the described cam surface 88 along its lower edge.

As shown in FIGS. 1 and 3 of the drawings, a pair of the shafts 83 are journaled in parallel spaced relation at the opposite ends of the platform 32, and synchronizing means 97 is provided for causing the shafts 83 to rotate at the same speed and at the same time. Preferably, a plurality of the rollers 86 are mounted in spaced relation along each of the shafts 83, here at the ends of the shafts, and each of the rollers 86 is engagable with a corresponding cam surface 88 connected by means of a cam plate 96 to the platform 32.

The synchronizing means 97 is provided by aligned sprockets on shafts 83, and a loop of roller chain 98 is entrained around the aligned sprockets. The shafts 83 are driven by an electric motor 99 having a sprocket 111 operatively connected through roller chain 112 to the sprocket 92. As the lost motion connection 89 causes the shafts 83 to revolve in concert, rotating slowly for a half turn and then rapidly for the other half of the turn, the platform 32 is first raised gently and then is dropped abruptly to provide the described jouncing action.

In the form of the invention illustrated in FIGS. 22 through 26 of the drawings, the jouncing action is accomplished by "bumping" the platform from below in the manner previously described. This bumping is accomplished by a hammering device 22 which, as here shown, includes hammer member 78 mounted for vertical reciprocation in position to impact anvil member 81 on the platform 32 with upward abrupt force on the upstroke of the hammer member. Drive means in the form of special air bag 79 is provided having an operative connection to the hammer member 78 and formed for driving the hammer member upwardly so as to strike the anvil member 81 mounted on the underside of the platform 32 to thus abruptly lift the anvil member and platform. Means 28 is provided for selectively inflating and deflating the special air bag 79 in the manner previously described.

Vertical guide means 37 is operatively connected between the platform and the frame 118 which rests upon the bed plate 36. Tension springs 119 are provided for facilitating return of the hammer member 78 to its lowered position illustrated in FIG. 23 of the drawings when special air bag 79 is vented. The control means 28 is formed for automatically supplying air under positive pressure to the air bag 79 and for automatically venting air from the air bag 79 for selectively abruptly raising the hammer member 78 to impact the anvil member 81 affixed to the platform 32 and for gently lowering the hammer member 78 away from the anvil member 81 and platform 32 preparatory to the next upstroke of the hammer member 78.

From the foregoing it will be seen that the apparatus for riddling wine in bottles of the present invention utilizes a novel and efficient jouncing action to accomplish better and faster riddling than has heretofore been available. The three methods of jouncing disclosed, namely, raising the platform supporting a stack of cases of bottles of wine to a desired height and abruptly dropping the platform through the use of rotary camming means, raising the platform to the desired height and abruptly dropping it through the use of air bags, and effecting jouncing by bumping the platform from below, each provides a novel method of mechanical riddling in which abrupt limited generally vertical force is exerted on the bottles of wine to accomplish efficient riddling.

What I claim is:

1. Apparatus for riddling bottled wine, comprising
   holding means formed for carrying a bottle of wine in generally neck-down inverted position,
   jounce means having an operative connection to said holding means and formed for selectively effecting abrupt limited generally vertical force on said bottle so as to accomplish riddling of the wine therein, and
   control means formed for automatically cycling said jounce means through active and passive periods of predetermined and adjustable duration.

2. Apparatus as described in claim 1, and wherein said control means further comprises clock means formed for automatically cycling said jounce means through a plurality of cycles at predetermined times and over predetermined time intervals.

3. Apparatus for riddling bottled wine, comprising
   holding means formed for carrying a bottle of wine in generally neck-down inverted position,
   jounce means having an operative connection to said holding means and formed for selectively effecting abrupt limited generally vertical force on said bottle so as to accomplish riddling of the wine therein,
   said jounce means comprising a support element formed for mounting said holding means for joint movement therewith, and
   drive means operatively connected to said support element and formed for effecting abrupt limited vertical movement of said support element.

4. Apparatus as described in claim 3, and wherein said drive means comprises a plurality of drive members operatively connected to said support element and adapted for engaging a fixed member, said drive members being mounted in laterally spaced relation to each other for lifting said support member evenly.

5. Apparatus as described in claim 4, and wherein vertical guide means is operatively connected between said support elements and said fixed member for preventing cocking of said support element relative to said fixed member.

6. Apparatus for riddling bottled wine, comprising
   holding means formed for carrying a bottle of wine in generally neck-down inverted position,
   jounce means having an operative connection to said holding means and formed for selectively effecting abrupt limited generally vertical force on said bottles so as to accomplish riddling of the wine therein,
   said abrupt limited general vertical force on said bottle being effected by dropping said bottle and said holding means to accomplish a downward movement,
   said bottle being abruptly halted at the bottom of said downward movement,
   lifting means for repeatedly lifting and dropping said bottle, and
   control means formed for actuating said lifting means at timed intervals.

7. Apparatus for riddling bottled wine, comprising
   holding means formed for carrying a bottle of wine in generally neck-down inverted position,
   jounce means having an operative connection to said holding means and formed for selectively effecting abrupt limited generally vertical force on said bottle so as to accomplish riddling of the wine therein,
   said abrupt limited generally vertical movement of said bottle being effected by bump means having a hammer member formed for abruptly raising said bottle from a position of rest.

8. Apparatus as described in claim 7, and wherein said drive means comprises a vertically expandable member formed for abruptly lifting said hammer member to impact against said holding means.

9. Apparatus as described in claim 8, and wherein said vertically expandable member is an air bag, and means is provided for selectively inflating and deflating said air bag.

10. Apparatus as described in claim 8, and wherein said apparatus further comprises control means formed for automatically supplying air under pressure and venting air from said air bags for selectively abruptly raising and gently dropping said hammer member at desired intervals.

11. Apparatus for riddling bottled wine in cases, comprising
    a platform adapted to receive and support a plurality of compartmented cases of bottles of wine to be riddled with said bottles standing on their neck ends, and
    jounce means connected to said platform and formed for selectively imparting abrupt limited generally vertical movement to said platform and cases of bottles thereon,
    said abrupt generally vertical movement being accomplished by dropping said platform from a height to afford abrupt downward movement,
    said platform being abruptly halted at the bottom limit of said downward movement, and
    adjustable stops defining the bottom limit of said downward movement.

12. Apparatus for riddling bottled wine in cases, comprising
    a platform adapted to receive and support a plurality of compartmented cases of bottles of wine to be riddled with said bottles standing on their neck ends, and
    jounce means connected to said platform and formed for selectively imparting abrupt limited generally vertical movement to said platform and cases of bottles thereon,
    said abrupt generally vertical movement being accomplished by dropping said platform from a height to afford abrupt downward movement, lifting means formed for repeatedly lifting and dropping said platform, and control means formed for actuating said lifting means at timed intervals.

13. Apparatus for riddling bottled wine in cases, comprising a platform adapted to receive and support a plurality of compartmented cases of bottles of wine to be riddled with said bottles standing on their neck ends, jounce means connected to said platform and formed for selectively imparting abrupt limited generally vertical movement to said platform and cases of bottles thereon, and control means formed for automatically cycling said jounce means through active and passive periods of predetermined and adjustable duration.

14. Apparatus as described in claim 13, and wherein said control means further comprises clock means formed for automatically cycling said jounce means through a plurality of cycles at predetermined times and over predetermined time intervals.

15. Apparatus as described in claim 14, and wherein said clock means is also formed for automatically cycling said motor control means through active and passive periods of predetermined and adjustable duration.

16. Apparatus for riddling bottled wine in cases, comprising a platform adapted to receive and support a plurality of compartmented cases of bottles of wine to be riddled with said bottles standing on their neck ends, jounce means connected to said platform and formed for selectively imparting abrupt limited generally vertical movement to said platform and cases of bottles thereon, said jounce means comprising a support element formed for mounting said holding means for joint movement therewith, and drive means operatively connected to such support element and formed for effecting abrupt limited vertical movement of said support element.

17. Apparatus as described in claim 16, and wherein said drive means comprises a plurality of drive members operatively connected to said support element and adapted for engaging a fixed member, said drive members being mounted in laterally spaced relation to each other for lifting said support member evenly.

18. Apparatus as described in claim 17, and wherein vertical guide means is operatively connected between said support elements and said fixed member for preventing cocking of said support element relative to said fixed member.

19. Apparatus for riddling bottled wine in cases, comprising a platform adapted to receive and support a plurality of compartmented cases of bottles of wine to be riddled with said bottles standing on their neck ends, and jounce means connected to said platform and formed for selectively imparting abrupt limited generally vertical movement to said platform and cases of bottles thereon, said abrupt limited generally vertical movement of said bottle being effected by bump means formed for abruptly raising said platform and bottles thereon from a position of rest followed by a relatively slow sinking return of said platform and bottles to said position of rest.

20. Apparatus for riddling bottled wine, comprising a platform adapted to receive and support a stack of compartmented cases of bottles of wine to be riddled with the bottles inverted and standing on their neck ends, a frame formed for supporting said platform with freedom of vertical movement, jounce means operatively connected to said frame and said platform and formed for selectively imparting abrupt limited generally vertical movement to said platform and said stack of cases thereon for riddling the wine in said bottles by causing solids and sediments suspended in said wine to travel downwardly into the necks of said bottles, and control means formed for operating said jounce means to cycle automatically at predetermined times and through periods of predetermined duration.

21. Apparatus as described in claim 20, and wherein said platform is provided with guide means carried by said frame and formed for preventing tipping and cocking of said platform during said vertical movement.

22. Apparatus as described in claim 20, and wherein said abrupt limited generally vertical movement of said bottle is effected by bump means formed for abruptly raising said platform and the bottles supported thereon from a position of rest.

23. Apparatus for riddling bottled wine, comprising holding means formed for carrying a bottle of wine in generally neck-down inverted position, jounce means having an operative connection to said holding means and formed for selectively effecting abrupt limited generally vertical force on said bottle so as to accomplish riddling of the wine therein, and means for vibrating said holding means and bottles of wine supported thereby to facilitate riddling.

24. Apparatus as described in claim 23, and wherein said means for vibrating is driven by an electric motor, and motor control means is further provided for controlling motor speed and starting and stopping times.

25. Apparatus for riddling bottled wine, comprising holding means formed for carrying a bottle of wine in generally neck-down inverted position, jounce means having and operative connection to said holding means and formed for selectively effecting abrupt limited generally vertical force on said bottle so as to accomplish riddling of the wine therein, said jounce means comprising a support element formed for mounting said holding means for joint movement therewith, and drive means operatively connected to said support element and formed for effecting abrupt limited vertical movement of said support element, said drive means comprising a plurality of drive members operatively connected to said support element and adapted for engaging a fixed member, said drive members being mounted in laterally spaced relation to each other for lifting said support member evenly, said vertical guide means being operatively connected between said support elements and said fixed member for preventing cocking of said support element relative to said fixed member, and said drive members being vertical expandable lifting members.

26. Apparatus as described in claim 25, and wherein said vertically expandable lifting members are air bags, and means is provided for selectively inflating and deflating said air bags.

27. Apparatus as described in claim 26, and wherein said apparatus further comprises control means formed for automatically supplying air under positive pressure to said air bags and for venting air from said air bags for selectively gently lifting and suddenly dropping said support element.

28. Apparatus for riddling bottled wine, comprising
holding means formed for carrying a bottle of wine in generally neck-down inverted position,
jounce means having an operative connection to said holding means and formed for selectively effecting abrupt limited generally vertical force on said bottle so as to accomplish riddling of the wine therein,
said abrupt limited generally vertical force on said bottle being effected by dropping said bottle and said holding means to accomplish a downward movement and abruptly halting said bottle at the bottom of said downward movement,
lifting means connected to said holding means for repeatedly lifting and dropping said bottle, and
control means for actuating said lifting means at timed intervals,
said lifting means being adjustable for selectively controlling the distance said bottle is dropped.

29. Apparatus for riddling bottled wine, comprising
holding means formed for carrying a bottle of wine in generally neck-down inverted position,
jounce means having an operative connection to said holding means and formed for selectively effecting abrupt limited generally vertical force on said bottle so as to accomplish riddling of the wine therein,
said abrupt limited generally vertical force on said bottle being effected by dropping said bottle and said holding means to accomplish a downward movement, said bottle being abruptly halted at the bottom of said downward movement,
vertical guide means operatively connected to said holding means,
said jounce means comprising
a support element formed for mounting said holding means for joint movement therewith, and
drive means operatively connected to said support element and formed for effecting abrupt limited vertical movement of said support element,
said drive means comprising
a plurality of drive members operatively connected to said support element and adapted for engaging a fixed member,
said drive members being mounted in laterally spaced relation to each other for lifting said support member evenly,
said vertically expandable lifting members comprising air bags, and
means for selectively inflating and deflating said air bags.

30. Apparatus for riddling bottled wine, comprising
holding means formed for carrying a bottle of wine in generally neck-down inverted position,
jounce means having an operative connection to said holding means and formed for selectively effecting abrupt limited generally vertical force on said bottle so as to accomplish riddling of the wine therein,
said jounce means comprising
a support element formed for mounting said holding means for joint movement therewith, and
drive means operatively connected to said support element and formed for effecting abrupt limited vertical movement of said support element,
said drive means comprising
rotary camming means formed for selectively effecting said abrupt generally vertical movement of said bottle and said holding means upon rotation of said camming means,
said rotary camming means comprising
a horizontal shaft journaled for rotation about its own longitudinal axis,
a roller eccentrically mounted on said shaft for movement therewith and rotatable around its own horizontal axis parallel to said axis of said shaft,
and a member connected to said support element and providing a cam surface engagable by said roller whereby rotation of said shaft effects lifting and dropping of said cam surface and said holding means.

31. Apparatus as described in claim 30, and wherein a lost motion connection is interposed between said shaft and said roller whereby rotation of said shaft causes said roller to lift said cam surface to a desired height coincident with the uppermost position of said roller and further rotation of said shaft releases said roller from said shaft whereby said roller and said cam surface and said holding means and said bottle fall rapidly, and limit means is provided for abruptly halting the fall of said bottle so as to effect riddling of the wine therein.

32. Apparatus as described in claim 30, and wherein said lost motion connection comprises a driven first sprag member journaled on said shaft in radially spaced relation thereto, and a second sprag member engagable with said driven first sprag member is connected to said roller for joint rotation therewith about the axis of said shaft.

33. Apparatus as described in claim 30, and wherein a plurality of said rollers are mounted in spaced relation along said shaft, and each of said rollers is engagable with one of said cam surfaces.

34. Apparatus as described in claim 30, and wherein a plurality of said shafts are journaled in parallel spaced relation, and synchronizing means is provided for causing said shafts to rotate at the same speed and at the same time.

35. Apparatus as described in claim 34, and wherein a plurality of said rollers are mounted in spaced relation along said shaft, and each of said rollers is engagable with one of said cam surfaces.

36. Apparatus as described in claim 35, and wherein said synchronizing means is provided by aligned sprockets on said shafts, and a loop of roller chain is entrained around said aligned sprockets.

37. Apparatus for riddling bottled wine, comprising
holding means formed for carrying a bottle of wine in generally neck-down inverted position,
jounce means having an operative connection to said holding means and formed for selectively effecting abrupt limited generally vertical force on said bottle so as to accomplish riddling of said wine therein, said abrupt generally vertical movement of said bottle being effected by bump means formed for abruptly raising said bottle from a position of rest, said bump means comprising a hammer member mounted for vertical reciprocation in position to impact and drive said holding means upwardly on the upstroke of the hammer member, and drive means having and operative connection to said hammer member and formed for driving said hammer member upwardly so as to abruptly lift said member and said holding means at desired intervals of time.

38. Apparatus for riddling bottled wine in cases, comprising a platform adapted to receive and support a plurality of compartmented cases of bottles of wine to be riddled with said bottles standing on their neck ends, and jounce means connected to said platform and formed for selectively imparting abrupt limited generally vertical movement to said platform and cases of bottles thereon, said apparatus further comprising means for vibrating said platform and cases of bottled wine thereon so as to further facilitate riddling.

39. Apparatus as described in claim 38, and wherein said means for vibrating comprises an eccentric weight journaled on the underside of said platform, and an electric motor is carried on said platform and operatively connected to said eccentric weight for rotating the latter to vibrate said platform at an intensity and rate determined by the speed of said motor and the mass and throw of said eccentric weight.

40. Apparatus as described in claim 38, and wherein said means for vibrating is driven by an electric motor, and motor control means is further provided for controlling motor speed and starting and stopping times.

41. Apparatus for riddling bottled wine in cases, comprising a platform adapted to receive and support a plurality of compartmented cases of bottled wine to be riddled with said bottles standing on their neck ends, and jounce means connected to said platform and formed for selectively imparting abrupt limited generally vertical movement to said platform and cases of bottles thereon, said jounce means comprising a support element formed for mounting said holding means for joint movement therewith, and drive means operatively connected to said support element and formed for effecting abrupt limited vertical movement of said support element, said drive means comprising a plurality of drive members operatively connected to said support element and adapted for engaging a fixed member, said drive members being mounted in laterally spaced relation to each other for lifting said support member evenly, vertical guide means operatively connected between said support element and said fixed member for preventing cocking of said support element relative to said fixed member, said drive members being vertically expandable lifting members.

42. Apparatus as described in claim 41, and wherein said vertically expandable lifting members comprise air bags, and means is provided for selectively inflating and deflating said air bags.

43. Apparatus as described in claim 42, and wherein said apparatus further comprises control means formed for automatically supplying air under pressure to said air bags and for automatically venting air from said air bags for selectively gently lifting and suddenly dropping said platform.

44. Apparatus for riddling bottled wine in cases, comprising a platform adapted to receive and support a plurality of compartmented cases of bottles of wine to be riddled with said bottles standing on their neck ends, and jounce means connected to said platform and formed for selectively imparting abrupt limited generally vertical movement to said platform and cases of bottles thereon, said abrupt limited generally vertical movement of said bottles being effected by bump means formed for abruptly raising said platform and bottles thereon from a position of rest, said bump means comprising a hammer member mounted for vertical reciprocation in position to impact and drive said platform upwardly on the upstroke of said hammer member, and drive means in the form of a vertically expandable member having an operative connection to said hammer member and formed for driving said hammer member upwardly so as to abruptly lift said member and said platform at desired intervals of time.

45. Apparatus as described in claim 44, and wherein said vertically expandable member is an air bag, and means is provided for selectively inflating and deflating said air bag.

46. Apparatus as described in claim 45, and wherein vertical guide means is operatively connected between said platform and a fixed member and is formed for preventing cocking of said platform relative to said fixed member.

47. Apparatus as described in claim 46, and wherein said apparatus further comprises control means formed for automatically supplying air under positive pressure to said air bag and for automatically venting air from said air bag for selectively abruptly raising said hammer member to impact said platform and for gently lowering said hammer member away from said platform.

48. Apparatus for riddling bottled wine, comprising a platform adapted to receive and support a stack of compartmented cases of bottles of wine to be riddled with the bottles inverted and standing on their neck ends, a frame formed for supporting said platform with freedom of vertical movement, jounce means operatively connected to said frame and said platform and formed for selectively imparting abrupt limited generally vertical movement to said platform and said stack of cases thereon for riddling the wine in aid bottles by causing solids and sediments suspended in said wine to travel downwardly into the necks of said bottles, control means formed for operating said jounce means to cycle automatically at predetermined times and through periods of predetermined duration, and guide means for said platform carried by said frame and formed for preventing tipping and cocking of said platform during said vertical movement, said guide means comprising a plurality of depending vertical rods secured in laterally spaced relation to said platform and a plurality of upwardly opening vertical tubes secured to said frame at their lower ends and formed for slidably receiving the upper ends of said rods.

49. Apparatus as described in claim 48, and wherein a stop member is positioned in each of said tubes for intercepting and abruptly halting downward movement of the lower ends of said rods.

50. Apparatus as described in claim 49, and wherein said platform is raised and then abruptly dropped by drive means comprising a plurality of drive members carried by said frame in laterally spaced relation and operatively connected to said platform.

51. Apparatus as described in claim 50, and wherein said drive members comprise vertically expandable lifting members.

52. Apparatus as described in claim 51, and wherein said drive members comprise vertically expandable air bags, and means is provided for selectively inflating and deflating said air bags.

53. Apparatus as described in claim 50, and wherein said drive members comprise rotary camming means formed for raising and abruptly dropping said platform upon rotation of said camming means.

54. Apparatus as described in claim 53, and wherein said rotary camming means comprises a horizontal shaft journaled on said frame for rotation about its own longitudinal axis, a roller eccentrically mounted on said shaft for joint movement therewith and rotatable about its own horizontal axis parallel to said axis of said shaft, and a member connected to said platform and providing a cam surface engagable by said roller whereby rotation by said shaft lifts and then drops said cam surface and said platform.

55. Apparatus as described in claim 54, and wherein the lost motion connection is interposed between said shaft and said roller whereby rotation of said shaft causes said roller to lift said cam surface to a desired height coincident with the uppermost position of said roller and further rotation of said shaft releases said roller from joint rotation with said shaft whereby said roller and said cam surface and said platform fall rapidly, limit means being provided on said frame for abruptly halting the fall of said platform so as to effect riddling of the wine in the bottles carried thereon.

56. Apparatus as described in claim 55, and wherein said lost motion connection comprises a first sprag member secured for joint rotation to said shaft in radially spaced relation thereto, and a second sprag member secured to said roller for joint rotation therewith about the axis of said shaft.

57. Apparatus as described in claim 56, and wherein a plurality of said rollers are mounted in spaced relation along said shaft and each of said rollers is engagable with one of said cam surfaces.

58. Apparatus as described in claim 57, and wherein a plurality of said shafts are journaled in parallel spaced relation, and synchronizing means is provided for causing said shafts to rotate at the same speed and at the same time.

59. Apparatus as described in claim 58, and wherein a plurality of said rollers are mounted in spaced relation along said shaft and each of said rollers is engagable with one of said cam surfaces.

60. Apparatus as described in claim 59, and wherein said synchronizing means is provided by aligned sprockets on said shafts, and a loop of roller chain is entrained around said aligned sprockets.

61. Apparatus for riddling bottled wine, comprising a platform adapted to receive and support a stack of compartmented cases of bottles of wine to be riddled with the bottles inverted and standing on their neck ends, a frame formed for supporting said platform with freedom of vertical movement, jounce means operatively connected to said frame and said platform and formed for selectively imparting abrupt limited generally vertical movement to said platform and said stack of cases thereon for riddling the wine in said bottles by causing solids and sediments suspended in said wine to travel downwardly into the necks of said bottles, and control means formed for operating said jounce means to cycle automatically at predetermined times and through periods of predetermined duration, said apparatus further comprising means for vibrating said platform and cases of bottled wine thereon so as to further facilitate riddling.

62. Apparatus as described in claim 61, and wherein said means for vibrating comprises an eccentric weight journaled on the underside of said platform, and an electric motor carried on said platform and operatively connected to said eccentric weight for rotating the latter to vibrate said platform at an intensity and rate determined by the speed of said motor and the mass and throw of said eccentric weight.

63. Apparatus for riddling bottled wine, comprising a platform adapted to receive and support a stack of compartmented cases of bottles of wine to be riddled with the bottles inverted and standing on their neck ends, a frame formed for supporting said platform with freedom of vertical movement, jounce means operatively connected to said frame and said platform and formed for selectively imparting abrupt limited generally vertical movement to said platform and said stack of cases thereon for riddling the wine in said bottles by causing solids and sediments suspended in said wine to travel downwardly into the necks of said bottles, and control means formed for operating said jounce means to cycle automatically at predetermined times and through periods of predetermined duration, said abrupt limited generally vertical movement of said bottle being effected by bump means formed for abruptly raising said platform and the bottles supported thereon from a position of rest, said bump means comprising a hammer member mounted for vertical reciprocation in position to impact and drive said holding means upwardly on the upstroke of said hammer, and drive means having an operative connection to said hammer member and formed for driving said hammer member upwardly so as to abruptly lift said member and said platform at desired intervals of time.

64. Apparatus for riddling bottled wine in cases, comprising a platform adapted to receive and support a plurality of compartmented cases of bottles of wine to be riddled with said bottles standing on their neck ends, jounce means connected to said platform and formed for selectively imparting abrupt limited generally vertical movement to said platform and cases of bottles thereon, said abrupt limited generally vertical movement being accomplished by dropping said platform from a desired height to afford abrupt downward movement, rotary camming means for selectively lifting said platform to a desired height and then abruptly dropping said platform upon rotation of said camming means, said rotary camming means comprising a horizontal shaft journaled for rotation about its own longitudinal axis, a roller eccentrically mounted on said shaft for movement therewith and rotatable about its own horizontal axis parallel to said axis of said shaft, and a member connected to said platform and providing a cam surface engageable by said roller whereby rotation of said shaft lifts and then drops said cam surface and said platform.

65. Apparatus as described in claim 64, and wherein a lost motion connection is interposed between said shaft and said roller whereby rotation of said shaft causes said roller to lift said cam surface to said desired height at the uppermost position of said roller and further rotation of said shaft releases said roller from joint rotation with said shaft whereby said roller and said cam surface and said platform fall rapidly, and limit means is provided for abruptly halting the fall of said platform so as to effect riddling of the wine thereon.

66. Apparatus as described in claim 65, and wherein said lost motion connection comprises a first sprag member secured for joint rotation to said shaft in radially spaced relation thereto, and a second sprag member secured to said roller for joint rotation therewith about the axis of said shaft.

67. Apparatus as described in claim 66, and wherein a plurality of said rollers are mointed in spaced relation along said shaft, and each of said rollers is engagable with a corresponding cam surface of said platform.

68. Apparatus as described in claim 66, and wherein a plurality of said shafts are journaled in parallel spaced relation, and synchronizing means is provided for causing said shafts to rotate at the same speed and at the same time.

69. Apparatus as described in claim 68, and wherein a plurality of said rollers are mounted in spaced relation along said shaft, and each of said rollers is engagable with a corresponding cam surface of said platform.

70. Apparatus as described in claim 69, and wherein said synchronizing means is provided by aligned sprockets on said shafts, and a loop of roller chain is entrained around said aligned sprockets.

* * * * *